United States Patent
Gopalakrishnan et al.

(10) Patent No.: US 7,385,954 B2
(45) Date of Patent: Jun. 10, 2008

(54) METHOD OF TRANSMITTING OR RETRANSMITTING PACKETS IN A COMMUNICATION SYSTEM

(75) Inventors: Nandu Gopalakrishnan, Chatham, NJ (US); Ganapathy Subramanian Sundaram, Hillsborough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 925 days.

(21) Appl. No.: 10/619,420

(22) Filed: Jul. 16, 2003

(65) Prior Publication Data

US 2005/0013303 A1 Jan. 20, 2005

(51) Int. Cl.
*H04B 7/216* (2006.01)
(52) U.S. Cl. ....................................................... 370/335
(58) Field of Classification Search ................ 370/310, 370/328, 335, 464, 465; 714/699, 746, 748
See application file for complete search history.

(56) References Cited

U.S. PATENT DOCUMENTS

| | | | |
|---|---|---|---|
| 6,738,370 B2* | 5/2004 | Ostman | 370/349 |
| 7,206,280 B1* | 4/2007 | Khan et al. | 370/216 |
| 2003/0097629 A1* | 5/2003 | Moon et al. | 714/751 |
| 2003/0153276 A1* | 8/2003 | Terry et al. | 455/69 |
| 2004/0170186 A1* | 9/2004 | Shao et al. | 370/412 |

\* cited by examiner

*Primary Examiner*—Hassan Kizou
*Assistant Examiner*—Betty Lee

(57) ABSTRACT

A method of transmitting or retransmitting a packet in a communication system. The method includes determining a modulation and coding scheme (MCS) to reduce the packet error rate (PER) for transmission, where the MCS is an aggregate of M redundant packet transmissions as a function of at least one of determined past channel conditions and/or allocated resources, determinable current channel conditions and/or allocated resources, future statistical channel conditions and/or allocated resources, and/or a cost function; and transmitting the packets in the communication system according to the MCS.

29 Claims, 3 Drawing Sheets

METHOD OF TRANSMITTING OR RETRANSMITTING PACKETS IN A COMMUNICATION SYSTEM

BACKGROUND OF THE INVENTION

Voice communication has been the dominant application in wireless networks. Cellular standards, such as Global System for Mobile Communication (GSM) and IS-95 were originally intended for voice traffic only. With the recent growth of the Internet, voice and high-speed data are now offered over wireless networks. One issue has been improving the physical layer efficiency of packet data services.

Third generation wide-area wireless networks include the introduction of packet data services over a CDMA network, in particular, the introduction of fast rate adaptation and smart scheduling over CDMA downlinks. More recently, incremental redundancy protocols have been proposed with a view towards gaining "time diversity" for short transmissions. One such protocol, which works well with the channel changes and smart scheduling, is the Adaptive Asynchronous Incremental Redundancy ($A^2IR$) protocol. Versions of this protocol were recently adopted as part of the 1xEVDV as well as high-speed downlink packet access ("HSDPA") standards.

FIG. 1 is a block diagram illustrating a portion of a prior art wireless communication system. As shown in FIG. 1, the wireless access network typically includes an access terminal (AT) 130, a communication transmission device such as a Base Station Transmission System (BTS) 120, and a communication system control device, such as a Base Station Controller (BSC) 110. The BSC 110 receives data from a core network and passes the data to the BTS 120 so that the BTS 120 can transmit the data to the AT 130 over a wireless link 125. Data is communicated in the reverse direction as well and passed from the AT 130 to the core network. The connection between the BTS 120 and BSC 110 is typically through a Ti link 115. A cluster of BTS units may be connected to a router, which in turn is connected to the controller via a T3 link.

A key to efficient delivery of the data packets transmitted from the BTS 120 to the AT 130, has become how efficient the transmission/re-transmission of data is scheduled and transmitted, given the redundant nature of a protocol, such as $A^2IR$. It should be understood that FIG. 1 is merely exemplary of the networks which may host such transmission/retransmission.

As an introduction to MCS, the concept of a hybrid automatic repeat request (ARQ) protocol is helpful. Considering the forward link of a wireless network, e.g. wireless link 125, and given an information block and some knowledge of the channel conditions, the network may proceed to choose a code rate and modulation, then transmit packets of data accordingly. AT 130, upon reception of the packet, conducts a cyclic redundancy check (after demodulation and decoding) in order to determine the efficiency of the transmission.

In second generation, and early versions of third generation data systems, if the CRC check did not pass, the packet would be deemed in error and it is left to the link layer ARQ, (e.g., the radio link protocol (RLP) and network layer ARQ protocols, such as the transmission control protocol (TCP)) to recover from the errors. In other words, complete re-transmission of physical layer packets was the only way to recover from link errors. However, hybrid ARQ (HARQ) protocols, which work on the physical layer, allow for the reuse of symbols/coded bits that were deemed erroneous, via "soft combining" of frames, with a view towards better utilization of physical layer resources.

For reuse, if after one transmission from BTS 120, an error is detected, the receiver does not discard the bits but instead retains them with the hope of combining them with future transmissions. Each transmission on its own may be erroneous, but the ensemble of transmissions may allow the frame to recover from link errors. Two conventional classes of hybrid ARQ protocols include chase combining (CC) and incremental redundancy (IR). The former protocol allows for combining of modulation symbols, whereas the latter involves the combining after demodulation but prior to decoding.

Referring to $A^2IR$, "adaptive" refers to the channel sensitive nature of the protocol where the modulation and channel coding scheme (MCS) is varied between retransmissions. "Asynchronous" refers to the time asynchrony that is allowed between successive transmissions (in order to work with the underlying scheduling algorithm). This leads to challenges of designing "smart scheduling" algorithms as well as "rate (or modulation and coding scheme (MCS)) selection."

Two constraints imposed by conventional HARQ protocols operating with other upper layer protocols on physical layer resource allocation are the residual packet error rate (PER) constraint and the maximum number of re-transmissions constraint. In order to ensure that individual user "packet call" delays are kept within limits, a reasonably low error rate should be presented to upper layers. In the interest of controlling average packet call delay, the number of physical layer (HARQ) re-transmissions permitted for a single packet cannot be unbounded. The notion of residual PER makes sense only with a finite number of HARQ re-transmissions. In practical systems the number of such re-transmissions is quite limited (e.g. 4).

SUMMARY OF THE INVENTION

Exemplary embodiments of the present invention are directed to more efficient and accurate techniques of utilizing the limited number of re-transmissions by improving MCS selection to transmit the required packets with a reduced amount of average transmission overage.

Exemplary embodiments of the present invention are also directed to techniques for efficient optimal-approaching MCS selection. Exemplary embodiments of the present invention are also directed to a technique for rate or MCS selection and scheduling of users in CDMA systems with Adaptive Modulation and Coding and Hybrid ARQ, for example, 1xEVDV and other high-speed downlink packet access (HSDPA) systems.

More specifically, exemplary embodiments of the present invention are directed to a method of transmitting or retransmitting a packet in a communication system comprising determining a modulation and coding scheme (MCS) and corresponding resource allocation as a function of at least one of a determined past, a determinable current, and a future statistic of at least one of channel conditions and resource allocation and transmitting a coded modulated version of the packet in said communication system according to the MCS.

Additional features and advantages of exemplary embodiments of the present invention will be more fully apparent from the following detailed description of example embodiments, the appended claims and the accompanying drawings.

Figure 1:
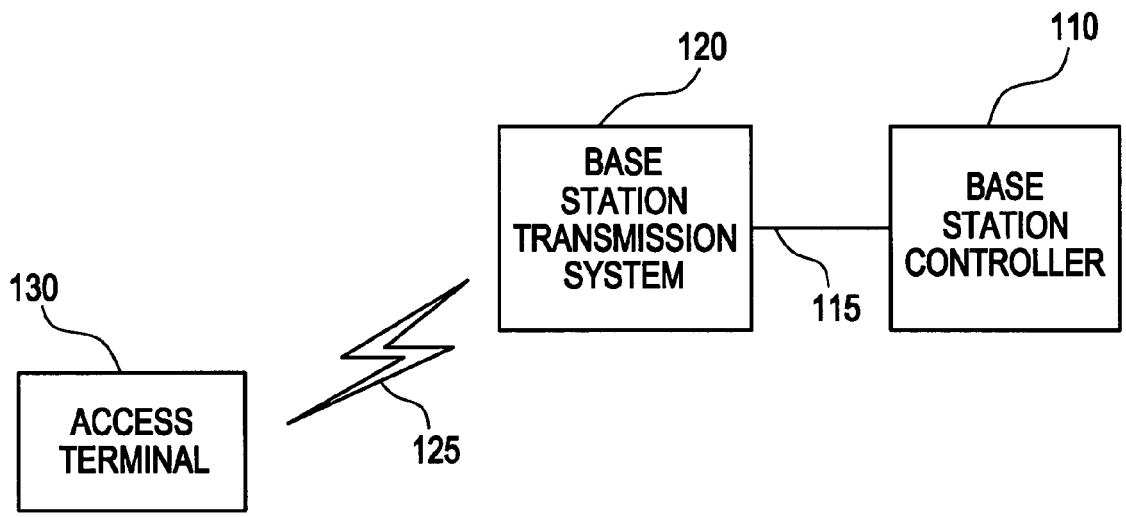
FIG. 1 is a block diagram illustrating a portion of a prior art wireless communication system, capable of hosting the method of exemplary embodiments of the present invention.

The accompanying drawings are intended to depict example embodiments of the invention and should not be interpreted to limit the scope thereof; and not to be considered as drawn to scale unless explicitly noted.

DETAILED DESCRIPTION OF THE EXEMPLARY EMBODIMENTS

Exemplary embodiments of the present invention provide a method of more efficiently and/or more accurately utilizing a limited number of retransmissions by improving MCS selection to transmit the required packets more efficiently. To better understand the method of the exemplary embodiments of the present invention, some mathematical concepts used in deriving the exemplary embodiments of the present invention will be explained. These mathematical concepts include a brief discussion on notation, aggregate approximations, quality of service (QoS) and delay constraints, the "bin packing" problem, examples of statistical bin packing, including several alternative algorithms, cost functions, overheads, folding rate selection, and available Walsh space. Exemplary embodiments of the present invention implementing these mathematical concepts will be explained with reference to FIGS. 2-4.

Notation and Brief Review

As discussed above, for a hybrid ARQ protocol and the forward link of a wireless network, given an information block and some knowledge of the channel conditions, a network can choose a code rate and modulation and transmit accordingly. A mobile, upon reception of the packet, conducts a cyclic redundancy check (after demodulation and decoding) in order to determine the efficacy of the transmission. In second generation, and early versions of third generation data systems, if the CRC check does not pass then the packet is deemed in error and it is left to link layer ARQ such as RLP and network layer ARQ protocols such as TCP to recover from these errors. In other words, "complete" re-transmissions of physical layer packets is the only way to recover from wireless link errors. On the other hand, hybrid ARQ protocols which work on the physical layer allow for the "re-use" of symbols/coded bits that were deemed erroneous, via "soft combining" of frames, with a view towards better utilization of physical layer resources. In other words, if after one transmission an error is detected the receiver does not discard the bits but instead retains them with the hope of combining them with future transmissions—each transmission on its own may be erroneous but the ensemble of transmissions may allow the frame to recover from any link errors. It is noted that the present invention is also applicable to the reverse link as well. For example, in the reverse link, when a mobile transmits a packet, the base station upon reception may check the CRC and send an ack/nack back to the mobile; if it is a nack, then the mobile can transmit the subsequent packet and the base station can perform soft combining or other functions. For the reverse link, some minor modifications to the equations may apply due to reverse link specific properties, for instance the SNR of the pilot may be factored in the calculations to determine the "traffic to pilot ratio" along with the MCS).

Two of the most popular classes of hybrid ARQ protocols include chase combining (CC) and incremental redundancy (IR). The former protocol allows for combining of modulation symbols, whereas the latter involves the combining after demodulation but prior to decoding. Recently, in the 1xEVDV system standardized by 3GPP2 as well as the HSDPA system standardized by 3GPP, IR based protocols applied to short frames were adopted in the forward link to exploit channel variations with finer time granularity but yet deriving the benefits of time diversity that large frames enjoy. For reasons set forth above, these protocols may also be used in the reverse link.

If B( ) is the information block or packet size to be transmitted and T( ) is the transmission time interval (TTI) or packet duration (sometimes referred to as Number of Slots (NOS)). In the case of HSDPA, T is held as a system constant (for example, 2 ms), whereas in the case of EVDV, $T(\ )\in\{1,2,4\}$ slots where one slot is fixed at 1.25 ms. The information data rate R( ) for the transmission is:

$$R(\ )=B(\ )/T(\ ) \qquad (1)$$

If μ is the modulation and coding scheme (MCS) used for the transmission, μ denotes essentially the pair (m, r) where m is the modulation order (e.g. m=1 for BPSK, 2 for ωPSK, 3 for 8-PSK and 4 for 16-QAM) and r is the code rate. The coded symbols (numbering B/r) are always picked as a subset of a "mother" code in both HSDPA (of rate ⅓) and EVDV (of rate ⅕) and this subset is referred to as a "sub-packet" or "redundancy version". In the reverse link, the mother code rate may be different—for example in EVDV, the mother code may be rate ¼. In HSDPA, m is allowed only the values 2 or 4 whereas in EVDV, m can take the values 2, 3 or 4. In the reverse link m could also be 1 for certain rates. $R_{chip}$ denotes the chip rate (1.2288 Mcps for EVDV and 3.84 Mcps for HSDPA) and SF denotes the Spreading Factor (SF=16 for HSDPA and SF=32 for EVDV). In the reverse link, SFs may also be 2 or 4. W denotes the number of Walsh or channelization codes used for the multi-coded transmission. $W<=W_{avail}$ where $W_{avail}$ is the number of Walsh codes available for the packet data channel after allocation for other dedicated channels (e.g. voice service). $W_{avail}<=15$ for HSDPA and $W_{avail}<=28$ for EVDV.

The quantities defined above are related by:

$$R=B/T=m.r.W.R_{chip}/SF \qquad (2)$$

In a system like HSDPA or EVDV, $R_{chip}$ and SF are system constants that do not change with time. The above relation implies that for each value of the modulation order m, μ is determined by the parameters (B, W, T). In EVDV, for fixed values of (B, W, T) the corresponding (m, r) pair i.e. μ is pre-decided. In other words, the choice of m is not signaled over the air so that the mobile may calculate the code rate r of the transmission as both components of the pair (m, r) are both implicitly known to the mobile once (B, W, T) are chosen by the network and signaled to the mobile i.e. µ is a function of variables (B, W, T).

In EVDV, r is restricted to be less than 1 for each transmission i.e. the size of any sub-packet in terms of coded bits is always greater than B. In HSDPA, the value of m (2 or 4) is signaled over the air to the mobile along with (B, W) so that it may calculate r, and furthermore it is possible for r>1. Non self-decodable formats with r>1 may be picked only in the case of IR re-transmissions so that the effective code rate of all accumulated sub-packets <1. Thus in HSDPA, µ is a function of variables (B, W, m).

If c(i) denotes the predicted channel C/I based on the feedback reported by the mobile that is used for scheduling, MCS selection for the re-transmission (or sub-packet) index i and c'(i) denotes the actual C/I encountered by the mobile during that re-transmission. The first transmission (sub-packet) of the packet is indexed by i=1 and subsequent re-transmissions increment the value of i. It is assumed in defining c(i) and c'(i) that they are based on some constant nominal power fraction $(E_c/I_{or})_{nom}$ allocated to the packet data channel. It can be assumed that $(E_c/I_{or})_{nom}$=1. c'(i) can differ from c(i) due to the prediction error in predicting the channel fading process and the SIR estimation errors in the mobile reports. The $E_c/I_{or}$ (power fraction) difference between the nominal value assumed for c(i) and the actual available value for c'(i) is separately accounted for. Multi-path channel effects and gains due to advanced receivers (other than RAKE) such as equalizers and multi-path interference cancellers are assumed accounted for in the equivalent AWGN C/I c(i) reported by the mobile.

P(c'(i), . . . c'(M)|c(i), c(i−k) ∀k>0) is a probability density function that is known to the base station, based on empirical observations of scheduling, quality based feedback etc. Given asynchronous scheduling operation, independence between events separated by long scheduling intervals can be invoked to factorize the distribution and simplify as:

$$P(c'(i), \ldots c'(M)|c(i), c(i-k)\forall k>0)= P(c'(i)|c(i)c(i-k)\forall k>0\_).P(c'(i+1)) \ldots P(c'(M)) \quad (3)$$

It is noted that the above simplifications and any associated assumptions regarding the pdf, are not necessary, and the algorithms described herein also work as without the simplifications.

Note that the scheduler action of favoring "good" channel conditions for a user's transmission is implicitly accounted for in the above definition. If a predictor is used to process the time series of mobile feedback to arrive at a predicted value for c(i) then the time series history term c(i−k) ∀k>0 can be dropped since it is included in the computation of c(i) and write:

$$P(c'(i), \ldots c'(M)|c(i))= P(c'(i)|c(i)).P(c'(i+1)). \ldots P(c'(M)) \quad (4)$$

Further a "stationarity" condition can be invoked as an additional assumption about the above pdf i.e.

$$P(c'(i+k), \ldots c'(M)|c(i+k))=P(c'(i), \ldots c'(M-k)|c(i)) \quad 95)$$

$f_{\mu k}$ (c'(i)) can be the short-term packet error rate function for the MCS µ(i)=$\mu_k$ (of packet size B) that encounters an effective channel C/I of c'(i). It is possible to closely approximate $f_{\mu k}$ (c'(i)) by the AWGN error rate function $f_{\mu\#}$ (c'(i)$\gamma_m$(µ(i),c'(i)) $\gamma_r$(µ(i), B)$\gamma_d$) of a reference MCS µ$^\#$ of packet size B$^\#$. The modulation (more precisely de-mapping) and the code rate difference related "penalty" factors $\gamma_m$, $\gamma_r$ respectively and Doppler related penalty factor $\gamma_d$ are explained in more detail below.

Aggregate $E_s/N_t$ Method and Penalties

A reasonable approximation to predict the link error performance of an information packet transmitted over a fading channel using several re-transmissions (sub-packets) that may have different MCS formats has been determined and approved as part of the 3GPP2 1xEVDV Simulation Methodology. This approximation, referred to as the Aggregate $E_s/N_t$ method, entails weighted accumulation of the modulation symbol energies of each (sample of every) re-transmission of that packet. After due scaling, the resulting equivalent $E_b/N_o$ (per information bit) is used to consult a reference link performance (waterfall) curve generated on an AWGN channel for a standard MCS format (e.g. QPSK ⅕ code rate in EVDV, QPSK ⅓ code rate in HSDPA). The "weights" applied are the penalties for puncturing and de-mapping of higher order modulations (as done in real world detectors/decoders) for any other MCS that was used for transmitting a portion of that packet. These penalties are appropriately pre-computed to ensure accurate error prediction. The approximation essentially works on the premise of block fading (quasi-static AWGN) of the transmission during the short sampling intervals (picked well below the coherence time). However the method corrects for deviations from this assumption at higher vehicle speeds by introduction of a "Doppler" penalty that is essentially the deviation of the actual short-term curve from AWGN. In summary, this approximation method and improvements thereto, enable the use of one "reference" link-error performance curve per block size along with a table of penalties to account for the deviations of the coding/modulation scheme, and the Doppler environment, from the reference curve.

QoS and Delay Constraints of HARQ Re-Transmissions

Two constraints imposed by practical HARQ protocols interoperating with other upper layer protocols on physical layer resource allocation are the Residual Packet Error Rate (QoS) constraint and Maximum Number of Re-transmissions constraint.

A reasonably low error rate is to be presented to upper layers in order to ensure that individual user "packet call" delays are kept within limits. Criteria such as Rate(1-PER), that maximize long-term user throughput while benefiting network throughput, work well at the user level only when flow into a user's buffer is infinite or very long. However, in the context of practical and common services such as web browsing, the average delay of the delivered web page is of some importance and must be assured within reasonable bounds. These delays can be exacerbated if the residual physical layer PER is high, in turn triggering several high latency upper (radio link control or RLC or radio link protocol=RLP) layer re-transmissions. In a similar vein, in the interest of controlling average packet call delay, the number of physical layer (HARQ) re-transmissions permitted of a single packet cannot be assumed very large or unbounded. The notion of residual PER presented to RLC layer itself makes sense only with a finite number of HARQ re-transmissions. In practical systems the number of such re-transmissions is quite limited (e.g. 4).

The Bin Packing Problem

For a given number of transmissions attempted M of a packet of size B=B(1) with associated MCS and channel conditions, the resulting error performance, i.e. packet error rate (PER) should be evaluated. The aggregate $E_s/N_t$ method approximates this by boiling down all variables of the transmissions into a single equivalent $E_b/N_o$ of a standard reference packet format of size B$^\#$, code of rate r$^\#$ (examples being a mother code of ⅕ rate in EVDV, ⅓ rate in HSDPA, and ¼ for the reverse link of EVDV) and modulation (QPSK in EVDV as well as HSDPA). The PER performance is then obtained by looking up this equivalent $E_b/N_o$ on an AWGN waterfall curve of the standard reference packet format denoted $f_{\mu\#}$. In the case of turbo-codes that have steep waterfall curves, a step function approximation of $f_{\mu\#}$ is used to gauge the success or failure of M transmissions by comparing the aggregated $E_b/N_o$ against a threshold $(E_b/N_o)^\#$ i.e. PER=0 or 1 depending on whether the aggregated $E_b/N_o$ after due penalties is respectively > or <=$(E_b/N_o)^\#$.

For schemes based on IR, the re-transmissions involve sending, as much as possible, a new set of coded bits i.e. non-identical code symbols, and hence processed at the code symbol level in the decoder after de-mapping. Additionally, in any "adaptive" IR scheme, the modulation and coding itself can change across re-transmissions. Based on the "aggregate $E_s/N_t$" method, the inequality that describes the criterion for successful transmission for $A^2IR$ is as follows:

$$\left\{ \sum_{i=1}^{M} E_c/I_{or}(i)c'(i)T(i)\gamma_m(\mu(i), E_c/I_{or}(i)c'(i)) \right\} \quad (6)$$

$$\gamma_r(\mu(1), \mu(2), \ldots, \mu(M), B(1))\gamma_d / B(1) >= (E_b/N_o)^\# / R_{chip}$$

Here, $\gamma_m(\mu(i), E_c/I_{or}(i)c'(i))\}$ represents the de-mapping penalty associated with the $i^{th}$ transmission and is a function of the modulation and the received SNR, $\gamma_r(\mu(1), \mu(2), \ldots, \mu(M), B(1))$ is the coding penalty and is a function of the effective code rate after M transmissions and $\gamma_d$ is the Doppler penalty.

In the case of chase combining (CC), the modulation and coding rate is picked independently only for the first transmission and remains fixed for re-transmissions i.e. $\mu(\ )$ is held constant across i. Also the coded bits are identical copies in each transmission and hence modulation symbols may be soft combined. The corresponding inequality for modulation level CC being decoded successfully is:

$$\left\{ \sum_{i=1}^{M} E_c/I_{or}(i)c'(i) \right\} T(1)\gamma_m\left(\mu(1), \sum_{i=1}^{M} E_c/I_{or}(i)c'(i)\right) \quad (7)$$

$$\gamma_r(\mu(1), B(1))\gamma_d / B(1) >= (E_b/N_o)^\# / R_{chip}$$

For CC, the de-mapping penalty $\gamma_m$ is applied only once at the end after the summation over all re-transmissions as a function of the accumulated $\Sigma(c'(i))$. The coding penalty $\gamma_r$ is computed only once for $\mu(1)$ and the same value is applied after any number of re-transmissions and does not decrease as in the case of IR. Thus, while CC may have a better de-map penalty due to single de-mapping at progressively increasing SNRs, it is worse in terms of coding penalty.

The $E_c/I_{or}(i)$ takes into account the control channel overhead $E_c/I_{or}^c(i)$ that has to be set aside to ensure that the accompanying packet data control channel is decoded with high success probability (and low false alarm and high detection probabilities) and is further assumed to be proportional to the number of Walsh codes $W(i)$ allocated for transmission i, i.e., $$\frac{E_c/I_{or}(i)}{(E_c/I_{or})_{avail} - (E_c/I_{or})^c(i)} = \frac{W(i)}{W_{avail}} \quad (8)$$

A reasonable assumption is that $(E_c/I_{or})_{avail}$ (on the average) and $W_{avail}$ are constants over the duration of a successful packet transmission. Hence $E_c/I_{or}(i)$ is automatically quantized according to the granularity of $W(i)$. Also $B(1)$ is quantized in real world systems (maximum of 4 levels in EVDV and 64 levels in HSDPA) and so are the modulation orders m, time intervals $T(i)$ and multi-codes allocated $W(i)$. The MCS $\mu(i)$ thereby ends up being quantized as well. If the $c'(i)$s are assumed quantized in certain steps (e.g. 1 dB) over a certain dynamic range (e.g. 16 or 32 dB) then every quantity in the inequality (6) is either a quantized variable or constant. In particular it has the form:

$$\sum_{i=1}^{M} \Omega(i)\rho(i) >= \beta \quad (9)$$

$\Omega(i)$ is shorthand for allocated resources such as time and multi-code bandwidth i.e. $(T(i), W(i))$ as well as the chosen packet size $B(1)$. $\rho(i)$ is shorthand for what is essentially the channel condition $c'(i)$ but is also a function of the allocated resource $\Omega(i)$ as in the case of de-mapping penalty $\gamma_m$. $\beta$ corresponds to the target $(Eb/No)^\#$ post scaling.

The problem of figuring out the error rate given M transmissions and corresponding resource allocations and channel conditions can be inverted to one of finding "good" resource allocations given a maximum number of re-transmissions $M_{max}$ and given the statistics of the channel fades. In other words, (9) can be rewritten as $$\sum_{i=1}^{M_{max}} \Omega(i)\rho(i) >= \beta \quad (10)$$

and seek resource allocation solution $\underline{\Omega}=[\Omega(1), \Omega(2), \ldots \Omega(M_{max})]$ such that some cost function $C(\underline{\Omega})$ of the assigned resources is reduced or minimized subject to the accompanying constraint of residual PER<$\epsilon$ being satisfied i.e., $$\min C(\underline{\Omega}) s/t$$

$$P\left( \sum_{i=1}^{M_{max}} \Omega(i)\rho(i) <= \beta \right) < \varepsilon \quad (11)$$

It can be assumed that the cost function of the vector resource allocation is a simple summation of the individual resource cost C components, i.e.

$$C(\underline{\Omega}) = \sum_{i=1}^{M_{max}} C(\Omega(i)) \quad (12)$$

Appropriate choices for the cost function are described in more detail below.

If the $\rho(i)$s are deterministic, then (10) is a bin-packing problem where $\Omega(i)$ are the objects of discrete sizes corresponding to allocated resources such as time and multi-code bandwidth as well as the chosen packet size. $\rho(i)$ are size altering variables and essentially represent the channel conditions $c'(i)$ but are also a function of the allocated objects $\Omega(i)$ as in the case of de-mapping penalty. $\beta$ is the target bin size to be filled by the objects and corresponds to the target $(Eb/No)^{\#}$. However, since the channel conditions are random and the $\rho(i)$s are size-altering random variables, the formulation of (11) becomes a Statistical Bin Packing (SBP) problem.

$\Omega(i) \in \{0, \Omega_a, \Omega_b, \ldots \Omega_{avail}\} = W$. W is a finite ordered set or alphabet of resource allocations that includes the case of zero resource allocation. $\Omega_a$ is the "atomic" or smallest resource allocation corresponding to the smallest transmission time allocation possible and the smallest, i.e. single, Walsh code allocation of standard spreading factor. $\Omega_{avail}$ is the largest resource allocation corresponding to the largest transmission time allocation possible and the largest, i.e. all, Walsh codes allocated from the pool made available for the scheduled packet data channel. In other words, for any element with index k in the set W, $\Omega_a <= \Omega_k <= \Omega_{k+1} <= \Omega_{avail}$. The ordering on the set W is based on the product of the number of codes and transmission time length.

It may be observed that any practical solution to (11) involves an "online" or real-time choice of the sequence $\underline{\Omega} = [\Omega(1), \Omega(2), \ldots \Omega(m_{max})]$ that attempts reduction or minimization of some expected normalized cost function such that the bin is filled with high probability $(1-\epsilon)$. "Online" means that the whole sequence $\underline{\Omega}$ is not chosen all at once during the first decision stage and left fixed thereafter. Instead, only $\Omega(1)$ is chosen based on the prediction of $\rho(1)$ and the statistics $P(\rho(1), \rho(2), \ldots \rho(M_{max})|\text{predicted } \rho(1))$ and then choose $\Omega(2)$ during the second decision stage based on the past choice of $\Omega(1)$ and the channel outcome $\rho(1)$ and the statistics $P(\rho(2), \rho(3), \ldots \rho(M_{max})|\text{predicted } \rho(2))$ and so on for $\Omega(3)$ through $\Omega(m_{max})$ i.e., an adaptive "self-correcting" multi-stage policy is used for resource allocation/MCS selection. At every stage indexed by I, attention is restricted to deterministic algorithms Ap that yield a deterministic output $\Omega(i)$ based on all inputs, deterministic and statistical. A good choice of $\Omega(1)$ by any good algorithm at the time of the first transmission would involve making an a priori estimate of what $\Omega(2), \Omega(3), \ldots \Omega(M)_{max}$ (i.e. the algorithm's own output) would be in the future. For example, the choice of $\Omega(2)$ during the second stage will be influenced by the choice of $\Omega(1)$ and the actual realization of $\rho(1)$. But since $\rho(1)$ is not exactly known (except statistically) ahead of time when $\Omega(1)$ is being decided, $\Omega(2)$ becomes a random variable during the first stage. Similarly during the first decision stage, $\Omega(3), \ldots \Omega(M_{max})$ also are random variables that represent the outputs of the same algorithm during future stages. Likewise at any transmission instant i, the variables $\Omega(1), \ldots \Omega(i)$ are deterministic whereas $\Omega(i+1), \ldots \Omega(M_{max})$ are random variables depending on $\rho(i), \rho(i+1)$ etc. Thus using a deterministic algorithm or policy $A_P$, the following choices are made:

$\Omega^{Ap}(1) = A_P(\text{predicted } \rho(1))$ is deterministic $\Omega^{Ap}(2) = A_P(\Omega^{Ap}(1), \rho(1), \text{predicted } \rho(2))$ is deterministic at stage 2 but random at stage 1.

$\Omega^{Ap}(k) = A_P(\Omega^{Ap}(1), \ldots, \Omega^{Ap}(k-1), \rho(1), \ldots \rho(k-1),$ predicted $\rho(k))$ is deterministic at stage k but random at stages k-1 and earlier $\Omega^{Ap}(M_{max}) = A_P(\Omega^{Ap}(1), \ldots, \Omega^{Ap}(M_{max}-1), \rho(1), \ldots \rho(M_{max}-1),$ predicted $\rho(M_{max}))$ is deterministic at stage $M_{max}$ but random variable at all earlier stages.

The subscript P is to indicate that the channel statistics (conditional pdf) is a parameter in deciding the $\Omega_{Ap}(i)$. Hereinafter this subscript is dropped for notational ease.

The problem then becomes finding the best policy A=* for $\Omega^A(k), k=1, \ldots, M_{max}$ i.e. * achieves:

$$\min_A E\left[\sum_{i=1}^{M_{max}} C(\Omega^A(i))\right] \quad (13)$$

$$s/t P\left(\sum_{i=1}^{M_{max}} \Omega^A(i)\rho(i) <= \beta\right) <= \varepsilon.$$

Note that the cost function introduced in (11) and (12) is now expressed as an expectation due to the randomness of the algorithm's future output.

For any fixed policy A and a given prediction of $\rho(1)$ and $P(\rho(1), \rho(2), \ldots \rho(M_{max})|\text{predicted } \rho(1))$, $\Omega^A(1)$ is deterministic. So the criterion for optimality for k=1 can be expressed as:

$$\min_A \left\{ C(\Omega^A(1)) + E\left[\sum_{i=2}^{M_{max}} C(\Omega^A(i)) \middle| \Omega^A(1)\right]\right\} \quad (14)$$

$$s/t P\left(\sum_{i=1}^{M_{max}} \Omega^A(i)\rho(i) <= \beta\right) <= \varepsilon$$

In general, for $1 < k <= M_{max}$ the criterion can be expressed as:

$$\min_A \left\{ C(\Omega^A(k)) + \right. \quad (15)$$

$$E\left[\sum_{i=k+1}^{M_{max}} C(\Omega^A(i)) \middle| \Omega^A(1), \ldots, \Omega^A(k-1), \rho(1), \ldots, \rho(k-1)\right]\right\}$$

$$s/t P\left(\sum_{i=1}^{M_{max}} \Omega^A(i)\rho(i) <= \beta \middle| \Omega^A(1), \ldots, \right.$$

$$\left. \Omega^A(k-1), \rho(1), \ldots \rho(k-1)\right) <= \varepsilon$$

Note that in the solution to (15) the number M of re-transmissions actually realized beyond which the $\Omega(i)$s are zero, is also a random variable of course bounded above by $M_{max}$.

Figure 2:
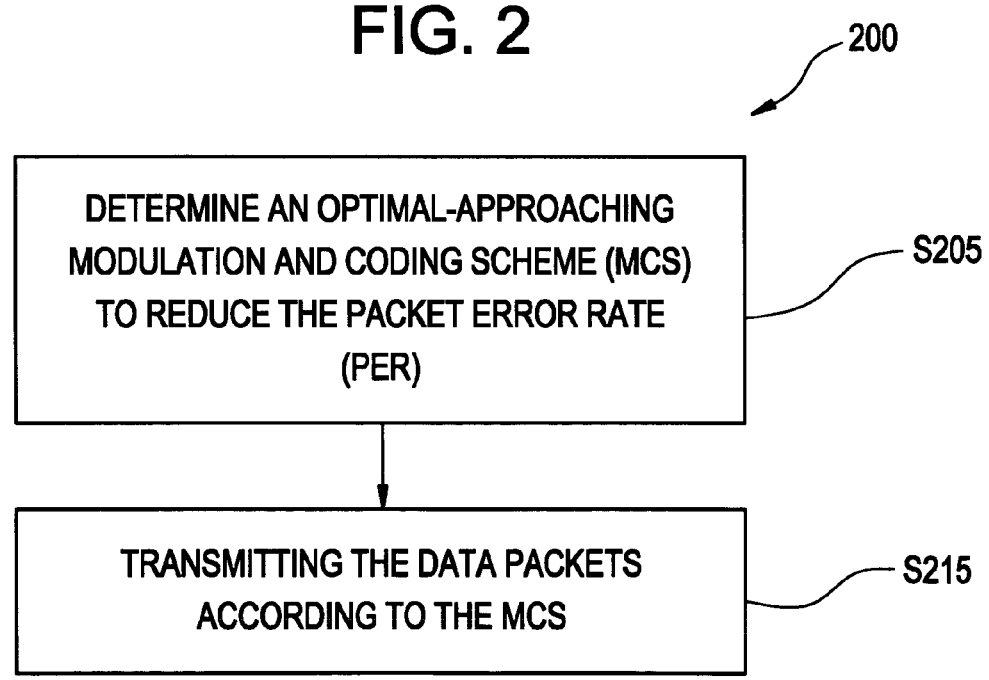
FIG. 2 is a block diagram illustrating a method of transmitting a packet using a modulation and coding scheme in accordance with an exemplary embodiment of the present invention.

FIG. 2 is a block diagram illustrating a method 200 of transmitting a packet using a modulation and coding scheme in accordance with an exemplary embodiment of the present invention, as implemented in the communication system of FIG. 1. In step S205, a network system of BTS 120 from FIG. 1, or its BSC 110 will determine the optimal-approaching modulation and coding scheme (MCS) to reduce the Packet Error Rate (PER). It will be understood by one skilled in the art that the near-optimal-approaching method may also be used as the MCS. Likewise, these exemplary methods are not limiting. Subsequent to finding the proper MCS 110, the BTS 120 may transmit the packet of data to the AT 130 in accordance with the chosen MCS in step S215. This embodiment is merely illustrative of one iteration in a system involving multiple transmissions (e.g., A²IR).

Note, in (15) the number M of re-transmissions actually realized beyond which the Ω(i)s are zero, is also a random variable of course bounded above by $M_{max}$.

Figure 3:
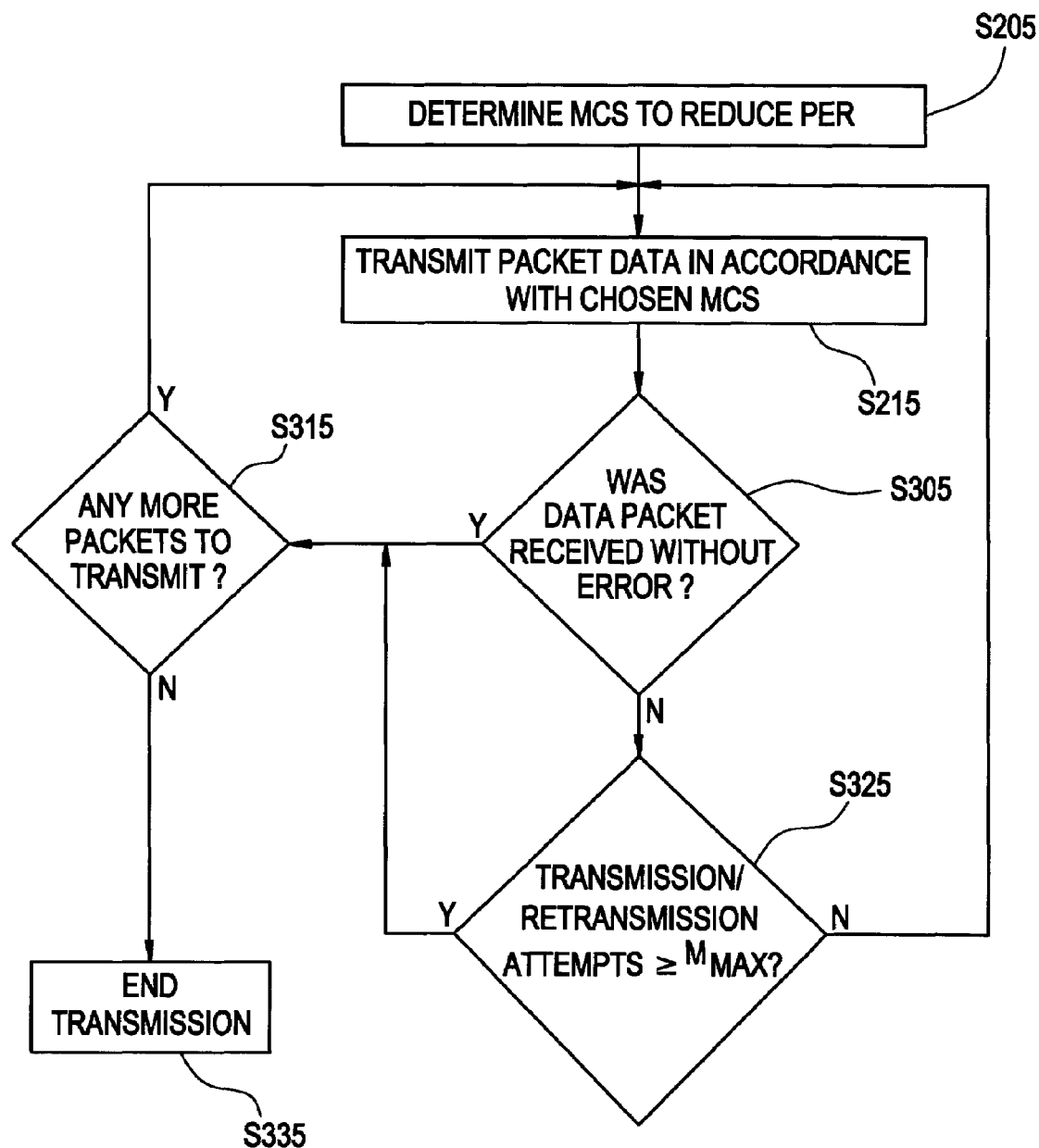
FIG. 3 is a block diagram illustrating a method of transmitting a packet using a modulation and coding scheme in accordance with another exemplary embodiment of the present invention.

FIG. 3 is a block diagram illustrating a method 300 of transmitting a packet using a modulation and coding scheme in accordance with another exemplary embodiment of the present invention, as implemented in the communication system of FIG. 1. Note, like steps from FIG. 2 are numbered identically in FIG. 3. Thus, in step S205 a transmitting apparatus, e.g., BTS 120 from the network system of FIG. 1 or its corresponding BSC 110, will determine the MCS to reduce PER. At step S215, the transmitting apparatus will transmit the packet of data to the receiving apparatus, e.g., the BTS 120 will transmit the packet of data to the AT 130, in accordance with the chosen MCS. As noted above, exemplary embodiments of the present invention may also be applied to the reverse link.

After the data packet is transmitted by BTS 120, there will be quality checks to determine whether the packet was received error free by AT 130 at step S305. As an example, in the HARQ environment, a HARQ Negative Acknowledgement (NACK) indicates there was an error, while a HARQ ACK indicates the packet was received without error.

If the packet was received without error by AT 130, the system will determine whether any other data packets remain to be transmitted from BTS 120, at step S315. If no other data packets remain to be transmitted, the transmission of data packets ends at step S335. However, if the system determines that the BTS 120 has other data packets to transmit, the BTS 120 will transmit the next data to the AT 130 according to the determined MCS. In an embodiment of the present invention, there may be a new determination of the MCS to transmit the remaining data packet(s).

However, if the system determines at step S305 that the data was received with an error (NACK), there will be a determination of whether the maximum transmissions ($M_{max}$) of the data packet has transpired. If the maximum number of re-transmissions by the BTS 120 has transpired, there will be a determination of whether any more data packets are waiting to be transmitted at step S315 and the method is executed as previously discussed.

If the $M_{max}$ has not been reached at step S325, the retransmission protocol of the system (e.g., A²IR) will re-transmit at least a portion of the data packet according to the system MCS at step S215. The system operates using the method thereafter, as described previously. It should be obvious that the communication system described herein is exemplary. It should be noted that one or both of the "Yes" output from step S315 and the "No" output from the step S325 could be input to step S205 for a redetermination of the MCS. It should also be noted that one of the numerous embodiments of the MCS methods described herein may be chosen at step S215 in the present invention.

EXAMPLES OF STATISTICAL BIN PACKING

As an example, the method of using the optimal-approaching embodiment may be illustrated using two transmissions (maximum) in (16)-(21).

Example Algorithm 1

An Optimal Algorithm $\Omega^*(1) = arg\ min_i \{C(\Omega_i) + \Sigma_{\rho(1)} C(\Omega^*(2|\rho(1), \Omega_i)$ $s/t \Sigma_{\rho(1)} \Sigma_{\rho(2)} P(\Omega_i \rho(1) + \Omega^*(2|\rho(1), \Omega_i) \rho(2) <= \beta|\rho(1),$
$\rho(2))P(\rho(1), \rho(2)) <= \epsilon$ (17)

where $\Omega^*(2|\rho(1), \Omega_i) = arg\ min_j C(\Omega_j)$ (18)

$s/t \Sigma_{\rho(2)} P(\Omega_i \rho(1) + \Omega_j \rho(2) <= \beta|\rho(1), \rho(2))P(\rho(2)) <= \epsilon$ (19)

For the second transmission, $\Omega^*(2|\rho(1), \Omega^*(1)) = arg\ min_j C(\Omega_j)$ (20)

$s/t \Sigma_{\rho(2)} P(\Omega^*(1)\rho(1) + \Omega_j \rho(2) <= \beta|\rho(1),$
$\rho(2))P(\rho(2)) <= \epsilon$ (21)

Note that $P(\rho(2))$ in (21) could be an updated pdf conditioned now on the latest prediction of $\rho(2)$, aided by latest mobile channel report, as opposed to the $P(\rho(2))$ in (19) which is conditioned on the prediction of $\rho(1)$.

In an embodiment of the invention, the residual probability of error (PER) constraints ((17), (19) or (21)) of bin packing may not have a solution. In such an embodiment, the largest amount of resource possible is allocated so that the amount by which the constraint is violated is reduced or minimized. In situations when cost function tie, the ties are broken in favor of the resource allocation that achieves lower probability of residual error, (i.e. excess energy per bit delivered albeit for the same cost).

In an embodiment of the invention, the nature of the optimal approaching method is to allocate more resources at a decision stage (or transmission) that had a better channel condition compared to others, given the same uncertainty or variance in the channel condition at each stage. Furthermore, if the channel conditions at two different stages were comparable, then more resource would be allocated to that stage which had less uncertainty or lower variance about the ensuing channel condition. This is because less variance implies less margin of resources to guarantee a certain error rate. Hence, in an embodiment for a low Doppler user scheduled the first time with a reasonably good channel condition, most if not all of the resource allocation is aimed at the first transmission, whose channel condition is well predicted (as opposed to subsequent faraway re-transmissions whose channel report at the time of scheduling and channel condition during actual transmission was less predictable). Conversely, in an embodiment for a high Doppler user where channel reports and predictions were essentially useless, the algorithm attempts to balance allocation of resources across all available transmissions, in order to gain increased or maximum time diversity and reduce or minimize total allocated resource in order to satisfy, for example, equations (17) and (19) above.

In an embodiment of the invention, an optimal-approaching choice of resource allocation, includes determining at least one of the optimal-approaching resource allocations of (a) a first transmission of the packet, (b) the $i^{th}$ transmissions of the packet (for $k<=i<M_{max}$), and (c) the last transmission for $k=M_{max}$. In another embodiment of the invention, the optimal-approaching choice of resource allocation for a first transmission is obtained by computing a minimum of a set of cost values subject to a constraint which is a function of a resulting frame error rate.

In another embodiment of the invention, the set of cost values is obtained by taking a sum of an actual cost associated with each choice of resource allocation for the first transmission and an estimated cost of any choice of resource allocation for transmissions two through $M_{max}$ which satisfy the constraint, including making a choice of resource allocations for the second through last transmissions, for every choice of resource allocation for the first transmission, compute the estimated costs associated with the choice made for the second transmission through the $M_{max}$ transmission, computing the sum of the cost of all the estimated costs and the actual cost associated with the choice made for the first transmission to produce a set of costs, selecting values in the set of costs for which the frame error rate constraints are met, and selecting the minimum value of the values selected as an optimal value.

In another embodiment of the invention, the optimal-approaching choice of resource allocation for the $i^{th}$ transmission (for $k<=i<M_{max}$) decided at any kth transmission stage ($1<=k<=Mmax$) is obtained by computing the minimum of a set of cost values subject to a constraint function expressing the resulting residual error probability. In another embodiment of the invention, the set of cost values is obtained by taking the sum of fixed costs associated with transmissions 1 through (i−1) based on deterministic resource allocation and channel conditions, a cost of every choice of resource allocation for the $i^{th}$ transmission, and an estimated cost of any choice of resource allocation for transmissions (i+1) through $M_{max}$ subject to satisfying the residual probability of error constraint function.

In another embodiment of the invention, the optimal-approaching choice of resource allocation for the last transmission decided at any kth transmission stage ($1<=k<=Mmax$) is obtained by computing the minimum of a set of cost values subject to a constraint function expressing a resulting residual error probability. In another embodiment of the invention, the set of cost values is obtained by taking the sum of the actual costs associated with all previous transmissions and expected costs of every choice of resource allocation for the last transmission subject to satisfying the residual error probability constraint.

In another embodiment of the invention, the optimal-approaching choice of resource allocation includes iteratively obtaining optimal values of the resource allocation at every stage beginning with the $M_{max}$ transmission and working backwards to the kth transmission of interest. In another embodiment of the invention, the optimal values of any stage i may be estimates or expectations, where at each step of the iterative process, resource allocations that do not satisfy the residual probability error constraint function are excluded. In another embodiment of the invention, the expectations are conditioned on deterministic resources and channel conditions measured, computed or assumed from stages previous to the $i^{th}$ stage.

Example Algorithm 2

A Near-Optimal Algorithm

Below are some examples of two transmissions maximum embodiments of the invention using a near-optimal-approaching method.

$$\Omega^{\#}(1)=arg\ min_i\{C(\Omega_i)+C(\Omega^{\#}(2|\Omega_i))\} \quad (22)$$

$$s/t\Sigma_{\rho(1)}\Sigma_{\rho(2)}P(\Omega_i\rho(1)+\Omega^{\#}(2|\Omega_i)\rho(2)<=\beta|\rho(1),\rho(2))P(\rho(1),\rho(2))<=\epsilon \quad (23)$$

where $\Omega^{\#}(2|\Omega_i)=arg\ min_j C(\Omega_j)$ (24)

$$s/t\Sigma_{\rho(1)}\Sigma_{\rho(2)}P(\Omega_i\rho(1)+\Omega_j\rho(2)<=\beta|\rho(1),\rho(2))P(\rho(1),\rho(2))<=\epsilon \quad (25)$$

For the second transmission, $$\Omega^{\#}(2|\rho(1),\Omega^{\#}(1))=arg\ min_j C(\Omega_j) \quad (26)$$

$$s/t\Sigma_{\rho(2)}P(\Omega^{\#}(1)\rho(1)+\Omega_j\rho(2)<=\beta|\rho(1),\rho(2))P(\rho(2))<=\epsilon \quad (27)$$

This a priori estimate of the allocation $\Omega\#(2|\Omega\iota)$ used in the computation of $\Omega^{\#}(1)$ in (22) is an alternative and it is computed as an average over $\rho(1)$ as well in (25), whereas, $P(\rho(1))$ of (25) may be a delta function a posteriori i.e. after $\rho(1)$ event has been realized. Since the variation in aposteriori $\rho(1)$ is assumed to exist, albeit perhaps less than optimal accurately with respect to the optimum-approaching embodiment, the overall resource allocation $\Omega^{\#}(1)+\Omega^{\#}(2|\Omega^{\#}(1),\rho(1),\rho(2))$ may be over-allocated. Furthermore, for the same reason of the variation in a posteriori $\rho(1)$ assumed existent, the resource allocation strategy of (22) will shift more resource towards $\Omega\#(1)$ relative to $\Omega^{\#}(2|\Omega^{\#}(1),\rho(1),\rho(2))$ compared with the optimal-approaching resource balancing that exists between $\Omega^{*}(1)$ and $\Omega^{*}(2|\Omega^{*}(1),\rho(1))$.

Due to combination of the above reasons, $\Omega\#(I)$ may be over-allocated compared to the optimal $\Omega^{*}(1)$ on the average. If the packet fails in the first transmission with $\Omega\#(1)$, then in the second transmission, the algorithm # will automatically allocate resources $\Omega\#(2)$ to correct for the over-allocation the first time. Also this time around it will do so by realistically assuming the perfect realization of $\rho(1)$ as in (27) as opposed to its statistical knowledge as in (25). On the other hand, the over-allocation of resource in the first transmission with $\Omega^{\#}(1)$ may cause it to succeed with more energy delivered per bit in the packet transmission than is necessary to maintain the residual PER, thus implying resource waste. One skilled in the art will appreciate that for a significant number of cases $\Omega^{\#}(1)>\Omega^{*}(1)+\Omega^{*}(2)$ and on the average, it will be true that $\Omega\#(1)+\Omega\#(2)>=\Omega^{*}(1)+\Omega^{*}(2)$.

In an embodiment of the invention, a near-optimal-approaching choice of resource allocation, includes, at any said $K^{th}$ transmission of the packet, determining a candidate vector value of resource allocations of current and future transmission of the packet up to $M_{max}$. In another embodiment of the invention, the resource allocation at any given stage is obtained by fixing any candidate vector value of resource allocations of the current and future stages up to $M_{max}$, if a total probability of residual error for the candidate resource allocation is larger than a target, the candidate resource allocation is rejected as infeasible, among all feasible candidate resource allocations, selecting the one with a minimum total cost, in case of ties, breaking ties in favor of the resource allocation vector that has the lowest residual error probability, and setting a first element of the resource allocation vector as the desired resource allocation for the current stage.

In another embodiment of the invention, fixing any candidate vector value of resource allocations of the current and future stages up to $M_{max}$ includes fixing a vector value of the future channel conditions with an associated channel condition vector probability of occurrence obtained from a joint probability density function that models the channel during times of the impending current and future transmissions of the packet, finding the conditional residual error probability for each candidate resource allocation conditioned on the fixed future channel conditions by looking up a reference error curve, multiplying the conditional error probability with the channel condition vector probability, varying the channel condition vector and its associated probability and repeating said fixing, finding, and multiplying steps and accumulate probabilities for each iteration to yield a total probability of residual error, and summing the costs of the candidate resource allocation components to obtain a total cost of the candidate resource allocation.

In another embodiment of the invention, the reference error curve is expressed as 0 if a desired signal-to-noise, due to the combination of fixed resource allocation and past, present and future channel conditions, is exceeded and 1, if not.

Example Algorithm 3

A Near-Optimal Algorithm (Approximate Maximum Expected Throughput (MET))

An alternate embodiment may be expressed as follows.

$$\Omega^\sim(1) = arg\ min_i \{C(\Omega_i) + \Sigma_{\rho(1)}\Sigma_{\rho(2)}C(\Omega^\sim(2|\Omega_i, \rho(1), \rho(2)))P(\rho(1), \rho(2))\} \quad (28)$$

$$s/t \Sigma_{\rho(1)}\Sigma_{\rho(2)}P(\Omega_i\rho(1)+\Omega^\sim(2|\Omega_i, \rho(1), \rho(2))\rho(2) <= \beta|\rho(1), \rho(2))P(\rho(1), \rho(2)) <= \epsilon \quad (29)$$

$$\text{where } \Omega^\sim(2|\Omega_i, \rho(1), \rho(2)) = arg\ min_j C(\Omega_j) \quad (30)$$

$$s/t P(\Omega_i\rho(1)+\Omega_j\rho(2) <= \beta|\rho(1), \rho(2)) <= \epsilon \quad (31)$$

For the second transmission, $$\Omega^\sim(2|\rho(1), \Omega^\sim(1)) = arg\ min_j C(\Omega_j) \quad (32)$$

$$s/t \Sigma_{\rho(2)}P(\Omega^\sim(1)\rho(1)+\Omega_j\rho(2) <= \beta|\rho(1), \rho(2))P(\rho(2)) <= \epsilon \quad (33)$$

This a priori estimate of the allocation $\Omega^\sim(2|\Omega_i, \rho(1), \rho(2))$ of (30) used in the computation of $\Omega^\sim(1)$ in (28) is an alternative, as it is computed assuming knowledge of $\rho(2)$ as in (30), (31), whereas in reality, $P(\rho(2))$ is not a delta function. Since the variation in $\rho(2)$ is assumed to be non-existent, albeit not necessarily true, the overall resource allocation $\Omega^\sim(1)+\Omega^\sim(2|\Omega^\sim(1), \rho(1), \rho(2))$ may be under-allocated. Furthermore, for the same reason of the variation in $\rho(2)$ assumed non-existent, the resource allocation strategy of (28) will shift more resource towards $\Omega^\sim(2|\Omega^\sim(1), \rho(1), \rho(2))$ relative to $\Omega^\sim(1)$ compared with the optimal resource balancing that exists between $\Omega^*(1)$ and $\Omega^*(2|\Omega^*(1), \rho(1))$.

Due to combination of the above reasons, $\Omega^\sim(1)$ may also be much under-allocated compared to the optimal $\Omega^*(1)$ on average. If the packet fails in the first transmission with $\Omega^\sim(1)$ then in the second transmission, the MET method will automatically allocate resources $\Omega^\sim(2)$ to correct for the under-allocation the first time. The MET method will do so by realistically assuming the actual variations in $\rho(2)$ as in (32), (33) as opposed to its knowledge explored in (30), (31). But the fact that it has to allocate a significant amount of resource in the last and only remaining transmission (i.e. without time diversity) may cause it to add margin and waste capacity or violate the residual PER constraint.

In an embodiment of the invention, a near-optimal-approaching choice of resource allocation, includes, at any said $K^{th}$ transmission of the packet, determining a candidate resource allocation of the current transmission of the packet and candidate vector value of resource allocations of the future stages up to $M_{max}$. In another embodiment of the invention, the resource allocation at any given stage is obtained by fixing a candidate resource allocation for the current stage, fixing any candidate vector values of resource allocations of future stages up to $M_{max}$, setting the total cost of resource allocation at the current stage as a function of the choice of current resource allocation to the expected minimum cost of the future allocation plus the cost of the choice of current resource allocation, among all feasible current resource allocations, selecting the one with the minimum total cost of resource allocation, and in case of ties, breaking the tie in favor of the current resource allocation vector that has the lowest residual error probability, where the current resource allocation that results in a minimum total cost is the desired resource allocation for the current stage.

In another embodiment of the invention, the step of fixing any candidate vector values of resource allocations of future stages up to $M_{max}$, includes fixing a vector value of the future channel conditions with an associated channel condition vector probability of occurrence obtained from a joint probability density function that models the channel during times of the impending current and future transmissions of the packet, finding the conditional residual error probability for the choice of current resource allocation and candidate future resource allocation conditioned on the fixed channel conditions by looking up a reference error curve, checking if the conditional error probability is greater than the target residual error probability and if yes, then the candidate future resource allocation is rejected as infeasible, if feasible, summing the costs of the candidate resource allocation components to obtain a total cost of the feasible candidate future resource allocation, selecting among all feasible candidate future resource allocations for that channel condition vector, the one with the least cost, wherein if no candidates are feasible, selecting the largest resource allocation, multiplying the conditional error probability of the least cost future resource allocation with the associated channel condition probability, varying the channel condition vector and the associated probability and repeating the fixing, finding and checking steps and averaging the least cost resource allocation by weighing with the channel condition vector probability of each iteration and summing to yield the average cost of future resource allocation given the choice of resource allocation for the current stage, accumulating the product of the conditional error probability and channel condition probability over all channel conditions, and checking if the resultant is less than a target residual error probability, and if so, the choice of current resource allocation is feasible.

In another embodiment of the invention, the reference error curve is expressed as 0 if a desired signal-to-noise, due to the combination of fixed resource allocation and past, present and future channel conditions, is exceeded and 1, if not.

Example Algorithm 4

A Near-Optimal Algorithm (Maximum Likelihood MCS)

Another alternate embodiment may be expressed as follows.

$$\Omega^{ml}(1) = arg\ max_h L(\Omega_h) \quad (34)$$

$$\text{where } L(\Omega_h) = \Sigma\Sigma P(\rho(1), \rho(2)) \quad (35)$$

$$\{(\rho(1), \rho(2)): \Omega^{ml}(1|\rho(1), \rho(2)) = \Omega_h\}$$

is computed for each $\Omega_h \in S$ (resource space), where:

$$\Omega^{ml}(1|\rho(1), \rho(2)) = arg\ min_i\{C(\Omega_i)+C(\Omega^{ml}(2|\Omega_i, \rho(1), \rho(2)))\} \quad (36)$$

$s/tP(\Omega_i\rho(1)+\Omega^{ml}(2|\Omega_i,\rho(1),\rho(2))\rho(2)<=\beta|\rho(1),\rho(2))<=\epsilon$ (37)

where $\Omega^{ml}(2|\Omega_i,\rho(1),\rho(2))=arg\ min_j C(\Omega_j)$ (38)

$s/tP(\Omega_i\rho(1)+\Omega_j\rho(2)<=\beta|\rho(1),\rho(2))<=\epsilon$ (39)

For the second transmission, $\Omega^{ml}(2|\rho(1),\Omega^{ml}(1))=arg\ min_j C(\Omega_j)$ (40)

$s/t\Sigma_{\rho(2)}P(\Omega^{ml}(1)\rho(1)+\Omega_j\rho(2)<=\beta|\rho(1),\rho(2))P(\rho(2))<=\epsilon$ (41)

The ML algorithm tries to target the MCS for each transmission that is "most likely" to consume the least amount of resources over any other MCS rather than the MCS that reduces or minimizes average resource consumption like the earlier algorithms and its variations. The algorithms #, ~ (approx MET) and ML are easy to implement in terms of on-line computation complexity and their implementation.

As an example, the method of using the optimal-approaching embodiment may also be illustrated using three transmissions (maximum) as set forth below.

Example Algorithm 4

An Optimal Algorithm

The following is an example of the optimal-approaching embodiment using three (3) transmissions maximum.

$\Omega^*(1)=arg\ min_i\{C(\Omega_i)+\Sigma_{\rho(1)}C(\Omega^*(2|\rho(1),\Omega_i))$
$P(\rho(1))+\Sigma_{\rho(1)}\Sigma_{\rho(2)}C(\Omega^*(3|\rho(1),\rho(2),\Omega_i,$
$\Omega^*(2|\rho(1),\Omega_i)))P(\rho(1),\rho(2))\}$ (42)

$s/t\Sigma_{\rho(1)}\Sigma_{\rho(2)}\Sigma_{\rho(3)}P(\Omega_i\rho(1)+\Omega^*(2|\rho(1),\Omega_{i\,\rho(1)},$
$\Omega_i))\rho(3)<=\beta|\rho(1),\rho(2),\rho(3))P(\rho(1),\rho(2),$
$\rho(3))<=\epsilon$ (43)

where $\Omega^*(2|\rho(1),\Omega_i)=arg\ min_j\{C(\Omega_j)+$
$\Sigma_{\rho(2)}C(\Omega^*(3|\rho(1),\rho(2),\Omega_i,\Omega_j)))P(\rho(2))\}$ (44)

$s/t\Sigma_{\rho(2)}\Sigma_{\rho(3)}P(\Omega_i\rho(1)+\Omega_j\rho(2)+\Omega^*(3|\rho(1),\rho(2),$
$\Omega_i,\Omega_j)\rho(3)<=\beta|\rho(1),\rho(2),\rho(3))P(\rho(2),$
$\rho(3))<=\epsilon$ (45)

where $\Omega^*(3|\rho(1),\rho(2),\Omega_i,\Omega^*(2|\rho(1),\Omega_i))=arg\ min_k C(\Omega_k)$ (46)

$s/t\Sigma_{\rho(3)}P(\Omega_i\rho(1)+\Omega_j\rho(2)+\Omega_k\rho(3)<=\beta|\rho(1),\rho(2),\rho(3))P(\rho(3))<=\epsilon$ (47)

For the second and third transmissions, the above equations (44) and (46) for $\Omega^*(2|\rho(1),\Omega^*(1))$ and $\Omega^*(3|\rho(1),\rho(2),\Omega^*(1),\Omega^*(2|\rho(1),\Omega^*(1)))$ respectively based on the actually realized histories of the previous transmissions and based on the latest channel feedback based predictions, are the same manner as the two transmission example for the optimal algorithm. In using the latest channel feedback, the stationary assumption of the pdf expressed in (5) may be invoked.

In an embodiment of the invention, a near-optimal-approaching choice of resource allocation, includes, at any said $K^{th}$ transmission of the packet, determining a channel condition vector of the current transmission of the packet and future transmission of the packet, having associated probability retrieved from a joint probability distribution function of channel conditions and determining a candidate vector value of resource allocation of the current transmission of the packet and candidate vector value of resource allocations of the future stages up to $M_{max}$.

In another embodiment of the invention, the resource allocation at any given stage is obtained by fixing a channel condition vector for the impending and future transmissions with associated probability taken from the joint probability distribution function of channel conditions, fixing any candidate vector value of resource allocations of the current and future stages up to $M_{max}$, said fixing any candidate vector value of resource allocations further including finding the conditional residual error probability for the choice of current resource allocation and candidate future resource allocation conditioned on the fixed channel conditions by looking up a reference error curve, checking if the conditional error probability is greater than the target residual error probability and if so, then the candidate future resource allocation is rejected as infeasible, if feasible, summing the costs of the candidate resource allocation components to obtain a total cost of the feasible candidate future resource allocation, among all feasible candidate future resource allocations for the channel condition vector, choosing the one with the least cost, if no candidates are feasible, choosing the largest resource allocation, selecting the choice of current resource allocation of the least cost future resource allocations and the associated channel condition probability, varying the channel condition vector and an associated probability and repeat the finding, checking, summing, choosing, and selecting steps and accumulating the channel condition probability separately in all cases where the choice of current resource allocation coincide, and assigning the choice of the current resource allocations that is most likely to cause a least cost resource allocation overall as the current resource allocation with the largest accumulated channel condition probability.

In another embodiment of the invention, the reference error curve is expressed as 0 if a desired signal-to-noise, due to the combination of fixed resource allocation and past, present and future channel conditions, is exceeded and 1, if not.

One of ordinary skill will realize these examples of optimal-approaching embodiments can be easily extended and generalized to the case of $M_{max}$ transmissions. A solution always exists to the problem for $M_{max}$ unbounded. Even if a user is in the worst c'(i) situation at all times, repeated allocation of the maximum ( ) resource over large enough number of transmissions will guarantee success (bin filling) with less than the residual error rate desired for the chosen block size. However, such a solution may not exist if $M_{max}$ is restricted to be finite, and this situation may become apparent at some later decision stage than the first. In that situation, the cost minimization criterion is not relevant as the maximum resource needs to be allocated from that point onwards. The residual PER constraint transforms into one of reducing or minimizing the "inequality" difference i.e. to minimize the amount of constraint violation, or in other words, to achieve as low a PER as possible.

It is noted that in exemplary embodiments of the invention, the packet size B(1) is considered an allocated resource for the first transmission only and is kept fixed thereafter, since this is the reality of stop and wait HARQ operation. It should be mentioned that the discrete formulation (bin packing) of the optimization problem and its solution takes into account the rate set granularity and all other quantized variables observed by the base station resource manager. Thus, even if there was no randomness associated with the channel, the solution of the bin packing formulation provides gains simply because it chooses a set of transmission format from the discrete space of those permissible tailored to reduce or minimize resource consumption which may otherwise be excessive (due to coarse granularity related round offs).

Cost Function and Optimal (MET) MCS Selection Algorithm

In many of the exemplary embodiments described above, the notion of allocated resources at the $i^{th}$ instant into a variable $\Omega(i)$ was abstracted and a cost $C(\Omega(i))$ associated to the allocation. In other exemplary embodiments of the invention, in EVDV, the base station decides the triple (B(1), W(1), T(1)). Likewise in HSDPA, the base station 120 decides the triple (B(1), W(1), m(1)) for the first transmission that is then signaled to the access terminal 130 which then interprets this information also as a unique MCS $\mu(1)$. Thus $\Omega(1)$ corresponds to these very triples for the two systems respectively. For k>1, B(k)=B(1) in both systems and is no longer an independent variable. Thus $\Omega(k)$, k>1 corresponds to the pair (W(k), T(k)) in EVDV and the pair (W(k), m(k)) in HSDPA, which is also interpreted as a unique MCS $\mu(k)$.

The true resources allocated to the user from a shared pool are the Walsh codes W( ), the proportional fraction of power $E_c/I_{or}$( ) and the time interval T( ). Thus, in an exemplary embodiment of the invention, a cost function for a given transmission may be expressed as the product of the code allocation and time allocation i.e. W(k)T(k). This cost is additive over a sequence of re-transmissions. Furthermore, it makes sense to normalize this cost over the benefit gained which is the number of bits transmitted i.e. the packet size B(k)=B(1). Hence we write:

$$C(\Omega(k))=W(k)T(k)/B(k)=W(k)T(k)/B(1). \quad (48)$$

In the case of HSDPA, since TTI is constant, $$C(\Omega(k))=W(k)T/B(k)=W(k)T/B(1). \quad (49)$$

Note, the power resource allocation is captured implicitly in the Walsh code allocation as they are assumed directly proportional to each other. When summed over k, the cost takes the form:

$$\Sigma_k C(\Omega(k))=(W(1)T(1)+W(2)T(2)+\ldots W(M_{max})T(M_{max}))/B(1) \quad (50)$$

Cost is to be reduced or minimized and can be interpreted as reducing or minimizing the energy spent per successfully transmitted bit. Equivalently, an exemplary embodiment of the invention for increasing or maximizing the reciprocal may be expressed as:

$$B(1)/(W(1)T(1)+W(2)T(2)+\ldots W(M_{max})T(M_{max})) \quad (51)$$

An embodiment further normalized with respect to the available Walsh space $W_{avail}$ may be represented as:

$$B(1)/\{(W(1)/W_{avail})T(1)+(W(2)/W_{avail})T(2)+\ldots (W(M_{max})/W_{avail})T(M_{max})\} \quad (52)$$

In the denominator of (52), the time allocated to each transmission is amortized by the fraction of multi-code bandwidth allocated and summed. This can be thought of as the "effective" or equivalent transmission time of the packet of size B(i) undergoing HARQ transmissions. Thus, the expression is essentially an "effective" HARQ rate or throughput of the user. Hence, in an exemplary embodiment of the invention, reducing or minimizing the resource cost metric discussed is advantageous to increase or maximize the HARQ rate of the user. Either interpretation suggests that the multi-user system throughput is also increased or maximized. The optimization problem becomes one of maximizing expected throughput (MET) when the direct sum of the code time resources has replaced an expected value of the sum i.e. a probabilistically weighted sum of the code time resources. As explained, an expectation or averaging becomes necessary because the "future" allocations of resource, taken into account during resource allocation at any stage, are random variables. Thus the metric to be maximized becomes:

$$\mathcal{R}^{harq}(1) = B(1)/E\left\{\sum_{i=1}^{M_{max}} W(i)T(i)/W_{avail}\right\} \quad (53)$$

So $B^*(1)$, $W^*(1)$, $T^*(1)$ are chosen to yield maximum $R^{harq}*(1)$ for the first transmission. It is noted that B(1) is also a parameter to be selected for the user in optimizing throughput subject to B(1)<=backlog in the user's buffers. For $1<k<=M_{max}$ re-transmission the metric to be maximized may be expressed as:

$$\mathcal{R}^{harq}(k) = B(1)/E\left\{\sum_{i=k}^{M_{max}} W(i)T(i)/W_{avail} \middle| c(k), c'(1), \ldots, c'(k-1), \mu(1), \ldots, \mu(k-1)\right\} \quad (54)$$

So $W^*(k)$, $T^*(k)$ are chosen to yield maximum $R^{harq}(k)$ for the for the $k^{th}$ transmission with $B(1)=B^*(1)$ already having been decided prior to the first transmission.

In the online embodiment of the maximum expected throughput (MET) criterion of the MCS selection problem at a given instant of scheduling, stage by stage decisions of $\mu^*( )$ up to the maximum permissible number of re-transmissions that optimizes an expected throughput metric $\mathcal{R}^{harq}$. $\mathcal{R}^{harq}( )$ is formulated as a function of B( ), W( ) and T( ) subject to certain QoS constraints (e.g. residual PER). Ties broken in favor of energy excess i.e. lower residual PER.

$$\mu*(1) = (W*(1), T*(1), B*(1)) \quad (55)$$

$$= \arg\min_i \left\{(W_i T_i + E\left[\sum_{k=2}^{M_{max}} W*(k \mid I(k-1))T* (k \mid I(k-1))/W_{avail} \mid c(1)\right])/B_i\right\}$$

where I(k−1) is shorthand notation for information about resources allocated in this step for stages earlier than k as a function of $(W_i, T_i)$ and the channel conditions assumed fixed up to time k−1, $$s/t \quad (56)$$

$$P\left\{\left\{\sum_{i=1}^{M_{max}} E_c/I_{or}(i)c'(i)T(i)\gamma_m(\mu(i), E_c/I_{or}(i)c'(i))\right\}\gamma_r(\mu(1), \mu(2), \ldots, \mu(M), B(1))\gamma_d/B(1) <= (Eb/No)^{\#}/R_{chip}\right\} <= \varepsilon$$

$s/tB_i$<=backlog (or instead of picking an optimal $B^*(1)$, an exemplary embodiment may round the backlog to the nearest $B_o$ permitted and set this equal to B(1)) (57)

where $(W^*(k|I(k-1)), T^*(k|I(k-1)))$ is defined (in a recursive fashion) as a function of $(W_i, T_i)$ and channel conditions up to time k−1 being fixed.

$$\mu^*(k) = (W^*(k), T^*(k)) \text{ for } k>1 \tag{58}$$

$$= \arg\min_i \left\{ \left( W_i T_i + E\left[ \sum_{j=k+1}^{M_{max}} W * \right.\right.\right. \tag{59}$$

$$(j|I(j-1))T*(j|I(j-1))/W_{avial} \mid c(k), c'(1), \ldots,$$

$$\left.\left.\left. c'(k-1), \mu(1), \ldots, \mu(k-1) \right] \right) / B*(1) \right\}$$

where $I(j-1)$ is shorthand notation for information about resources allocated previously or in this step for stages earlier than j as a function of $(W_i, T_i)$ and the channel conditions already known or assumed up to time j−1, $$s/t \quad P\left( \left\{ \sum_{i=1}^{M_{max}} E_c/I_{or}(I)c'(i)T(i)\gamma_m(\mu(i), E_c/I_{or}(i)c'(i)) \right\} \gamma_r(\mu(1), \mu(2), \right. \tag{60}$$

$$\left. \ldots, \mu(M), B(1))\gamma_d/B(1) \Longleftarrow (Eb/No)^\# / R_{chip} \right) \Longleftarrow \varepsilon$$

where $(W^*(j|I(j-1)), T^*(j|I(j-1)))$ is defined (in a recursive fashion) as a function of $(W_i, T_i)$ and channel conditions up to time j−1 being fixed.

An exemplary embodiment of the present invention may invoke Bellman's Dynamic Programming principle of optimality for multi-stage decision problems. If the policy adopted at every stage is optimal given the past decisions, then the policy is overall optimal. The proof method is hence inductive.

Overheads

One skilled in the art will appreciate that the overheads (power and codes) consumed by each user's transmission or re-transmission are accounted for in the resource cost. Without proper accounting for the overhead costs, the solution may favor distributing resources across too many re-transmissions potentially proving to be too costly and suboptimal in actual operation with overheads. In an embodiment of the invention, the cost includes a cost of associated control channel overheads.

An exemplary embodiment of the invention also accounts for the control channel code usage by adding the Walsh code fraction it consumes into the W(i) term of the cost function. The overhead power value depends on the channel report based prediction c(i), T(i) and a margin against Doppler induced predictor variance and is factored into the aggregate $E_c/N_t$ equation as an additional per-transmission penalty. Thus, the overhead power penalty for the control channel is a function of the c(i), T(i) and P(c'(i)|c(i)). However, since at the $k^{th}$ stage, c(i) is not considered other than c(k) as a variable, a simpler approach may be used rather than add complexity and dimensions by adding new random variables in the form of the channel reports c(i) into the SBP formulation. The control channel power overhead over all c(i)s weighted by the pdf P(c(i)|c'(i)) are averaged. That is, compute $E_c/I_{or}^c(T(i), c(i), P(c'(i)|c(i)))$ based on usual methods of looking up conditional long-term error curves for the desired control channel FER. Then computing, $$E_c/I_{or}^c(T(i), c'(i)=\alpha) = \Sigma E_c/I_{or}^c(T(i), c(i)=\beta, \\ P(c'(i)|c(i)=\beta))P(c(i)=\beta|c'(i)=\alpha) \tag{61}$$

where $P(c(i)=\beta|c'(i)=\alpha) = P(c'(i)=\alpha|c(i)=\beta)P(c(i)= \\ \beta)/P(c'(i)=\alpha)$ \tag{62} which can be simplified by invoking stationarity assumption as:

$$P(c(i)=\beta|c'(i)=\alpha) = P(c'(1)=\alpha|c(1)=\beta)P(c(1)= \\ \beta)/P(c'(i)=\alpha) \tag{63}$$

The penalty due to the control channel appears as a reduction in the power fraction $E_c/I_{or}(i)$ allocated to the packet data channel in the $i^{th}$ transmission by an amount equal to the approximate power fraction demanded by the control channel $E_c/I_{or}^c$ (T(i), c'(i)) for its reliable decoding. So, in the general case of IR with overheads, by plugging in (8) into (6), the bin-packing inequality for success may be expressed as:

$$\left\{ \sum_{i=1}^{M_{max}} (E_c/I_{or\ avail}(i) - E_c/I_{or}^c(T(i), c'(i)))W(i)c'(i)T(i)\gamma_m(\mu(i), \right. \tag{64}$$

$$(E_c/I_{or\ avail}(i) - E_c/I_{or}^c(T(i), c'(i)))(W(i)/W_{avail}), c'(i)) \right\}$$

$$\gamma_r(\mu(1), \mu(2), \ldots, \mu(M), B(1))\gamma_d/B(1) >=$$

$$(E_b/N_o)^\# W_{avail}/R_{chip}$$

Thus, from the total $E_c/I_{or}$ (i) allocated to the user in proportion to the allocated number of channelization codes, only a portion (after accounting for overheads) is useful for packet data transmission.

At higher Doppler and lower c(i), the overhead power spent for control channel signaling can be quite high especially if the TTI is small. This is because the control channel among other things carries information about the user ID and has to be signaled with high reliability to keep the packet data channel throughput high, for each individual re-transmission. Thus, it does not have the benefit of extensive time diversity that the packet data channel enjoys due to Hybrid ARQ. Thus, the fade margin set aside for high Doppler users to meet long term control channel performance targets can be high.

The high overhead cost for high Doppler users would suggest favoring a strategy of allocating resources to the packet data to succeed with fewer re-transmissions. Note the main strategy of stretching the resources spent for the packet data channel over a long period of time via several re-transmissions such that the resource allocated for each re-transmission and overall is small due to time diversity advantage more important in one embodiment favoring a strategy of allocating resources to the packet data to succeed with fewer re-transmissions. In fact, if the overheads could be neglected for high Doppler users, the optimum resource allocation would follow a pattern of minimum resource allocated per re-transmission and to extend to as many transmissions as needed. Thus two opposing requirements for control and traffic collide and cause the optimum number of transmissions and resource allocated per transmission to be centered.

Folding Rate Selection

In the metric to be optimized, the code time product cost expected in the future by the number of codes available in each TTI and sum may be normalized. This yields an effective transmission time. The block size divided by this time yields the effective HARQ rate $\mathcal{R}^{harq}(\ )$. $\mathcal{R}^{harq}(\ )$ is based on only future transmission times and formats expected while including the accumulated energy from previous transmission instances. This HARQ effective rate can be directly used as the "channel rate" in the priority function computation of the scheduling algorithm. For example, Modified C-RMAX: Deadline=$J\ W\ S/R(t)+a$ where $$R(t)=\mathcal{R}^{harq}(t) \quad (65)$$

where the parameters used are J for user's job size, W for weighting function, S for stretch, a for arrival time etc.

Modified Proportional Fair: Priority=$R(t)/\tau$ where $R=\mathcal{R}^{harq}(t)$ (66)

where $\tau$ is a windowed user throughput measure.

In an exemplary embodiment of the present invention, for first transmission comparisons, higher Doppler users who incur higher effective transmission times due to their dependence on time diversity lengthening will be accorded lower priority over low Doppler users with low mean prediction error, given sufficient granularity for the latter. However, as the transmissions proceed and energy accumulates for the high Doppler user, the user's priority comparison against low Doppler users becomes more and more favorable as energy accumulates making the user less susceptible to fading variations, and only future transmission time is counted to calculate the user's rate. Thus with time diversity gain accruing high Doppler users get scheduling preferential treatment on par with low Doppler users. The comparison of high versus low Doppler is based on the same channel condition feedback report.

Higher Doppler users will likely enter into re-transmissions automatically due to the nature of the rate selection algorithms and get capacity gains due to Hybrid ARQ. This last gain is measured by comparing the more "aggressive" instantaneous rate selection (or resource allocation) of Statistical Bin Packing algorithms and the net rate achieved after many such re-transmissions for a single packet to success against the conservative rate (or over allocation of resources) yielded by consulting the long-term curve if only one transmission were permitted as in pure rate adaptation with the same residual PER constraint.

In the Statistical Bin Packing optimal algorithm, the very last re-transmission permitted must have enough resources allocated to ensure the residual error rate. Hence, for the last permitted transmission alone, the algorithm effectively consults a conditional long-term error curve to satisfy the target error rate. The conditioning arises due to a given amount of pre-accumulated energy and the latest channel report that are known to the base station by monitoring the mobile's channel quality feedback. If there is reasonable amount of energy accumulated (which is an additive term) already due to sufficient number of re-transmissions, then the final transmission channel fade will have less effect (since this is a multiplicative term on the next transmission only) and there is an achieved SNR floor. Hence the conditional long-term curve approaches a short-term curve, which has better performance—thus the time diversity due to multiple transmissions comes into effect.

The above metric of "effective HARQ rate" $\mathcal{R}^{harq}$ also captures the "frame fill" or "packing" efficiency issues arising out of small sized packets or small backlogs, since the transmission time is amortized by the fraction of codes actually allocated at each stage. Thus accounting for partial resource usage due to small packets.

Available Walsh Space

An implicit assumption in the optimality of an algorithm is the total available Walsh codes and $E_c/I_{or}$ do not change over the time of packet transmission. Such an assumption for Walsh codes is reasonable considering the long time constants of its change compared to the typical packet transmission times. Variations due to power control in actual Ec/Ior available for the $i^{th}$ transmission with respect to the average available over a packet transmission can be grouped together with the statistics of the variations in the corresponding c'(i)s and hence incorporated within the P(c'(i)|c (1)).

Furthermore, it may be assumed that a user has the ability to utilize all the available Walsh codes and Ec/Ior whenever he/she is scheduled for each re-transmission. Thus the user is assumed as a first priority user in the "greedy fill" scheduling process (considered a good sub-optimal heuristic of low complexity). This is a fair assumption to make in making a comparison of all users while making scheduling decisions based on HARQ effective rates. Also it is a fair approximation if the first user typically occupies most of the available bandwidth in each TTI (i.e. he has significant though not necessarily infinite backlog in his/her buffers).

However, in rate selection (post scheduling), this assumption can be modified if so desired in the following manner. The first priority user's resource allocation is subject to the constraint that $W^*(i|) <= W_{avail}$ for all i, i.e. for i=current instant k and all future instants. However for the $p^{th}$ priority user, the user's resource allocation is subject to the constraint that:

$$W_p^*(k\,|)<=W_{avail}-\sum_{u=1}^{p-1} W_u^*(k\,|) \quad (67)$$

i.e. remaining Walsh codes after greedy filling p−1 other users at the current instant of scheduling k becomes the new Walsh code limit and $$W_p^*(i|)<=W_{avail}\ \text{for all i>k.} \quad (68)$$

i.e. such a greedy fill induced limit is ignored while considering scheduling of the $p^{th}$ user in future time instants. A similar set of constraints applies for the $E_c/I_{or}$ allocation to greedy filled users.

Such simplifications can be corrected if so desired, by including the available Walsh codes for each user as another random variable (and hence the varying priorities of that user are accounted for) with known statistics and averaging the metric $R^{harq}$ over the sample space. Of course, the MCS selection at each TTI is constrained by the available Walsh codes. The proportional variation in user $E_c/I_{or}$ available may be subsumed into the c'(i) statistics.

Also, the Ec/Ior allocation can be made into a separate quantized dimension, by uncoupling it from the constraint of having it to be proportional to the number of Walsh codes allocated.

Figure 4:
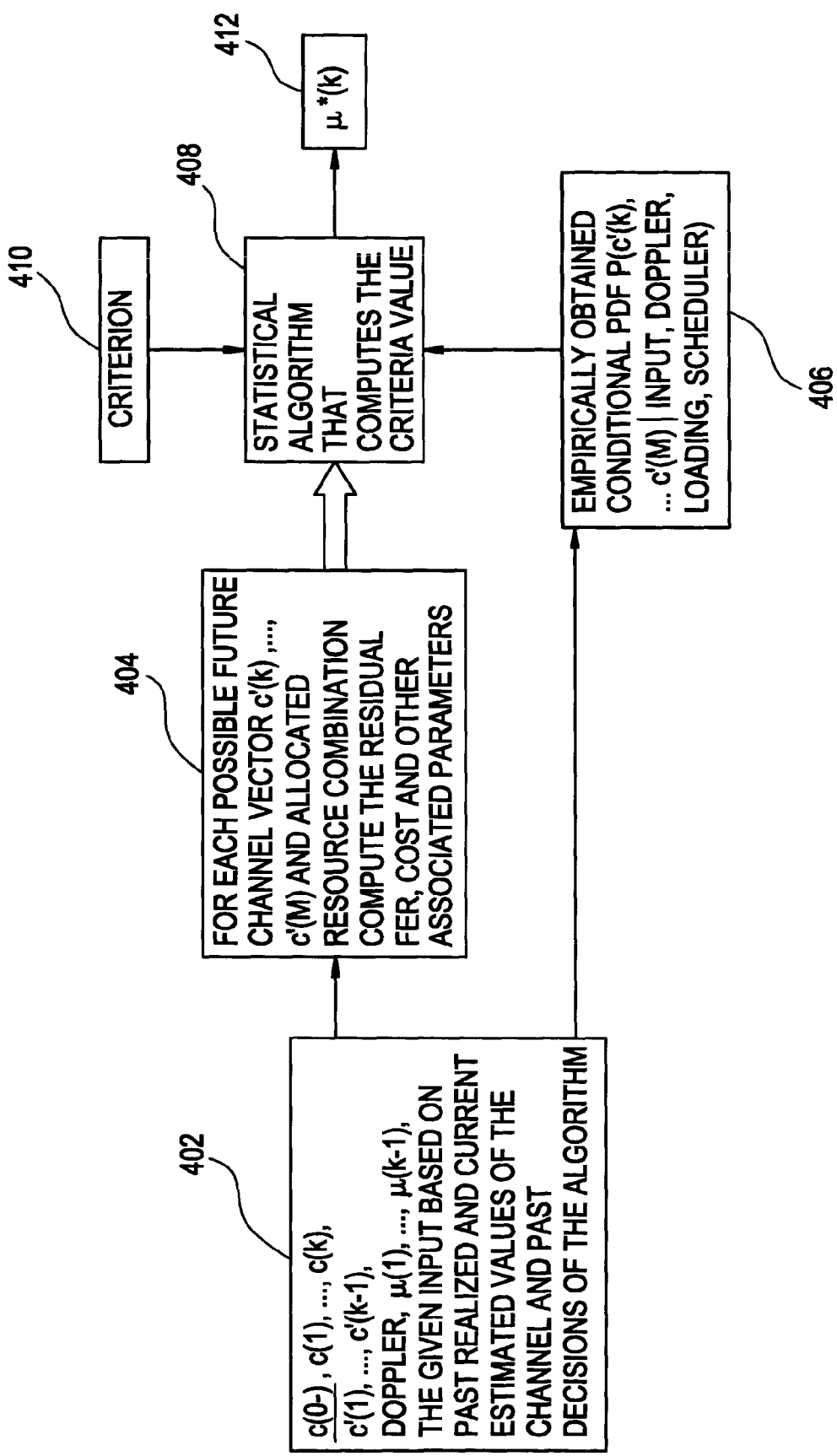
FIG. 4 illustrates an exemplary flow chart of the operation of statistical bin packing that involves both offline computed look up tables and online computations in real time in accordance with an exemplary embodiment of the present invention.

FIG. 4 illustrates an exemplary flow chart of the operation of Statistical Bin Packing that involves both offline computed look up tables and online computations in real time. Regarding obtaining the joint pdf P( ) of a user in practice, at the beginning of a user's packet call when there is insufficient history about the user, one could start with a $P_{sim}(\ )$ obtained from simulations categorizing the user by Doppler, average geometry and cell loading (i.e. number of voice users, number of data users). Then as history for the user $P_{hist}(\ )$ builds up, one could apply a straight line interpolation with appropriately chosen decay parameter $\lambda(t)$ and obtain:

$$P(l)=\lambda(t)P_{sim}(l)+(1-\lambda(t))P_{hist}(l) \qquad (69)$$

where $\lambda(t)=Ae^{-wt}$ (70)

As shown in block 402 of FIG. 4, inputs c(0−), c(1), . . . , c(k), c'(1), . . . , c'(k−1), Doppler, µ(1), . . . , µ(k−1), are provided, which are based on past realized and current estimated values of the channel and past decisions of the algorithm. For each possible future channel vector c'(k), . . . , c'(M) and allocated resource combination, the residual FER, cost and other associated parameters are computed at block 404 and provided to one of the exemplary statistical algorithms described above at block 408. In block 406, empirically obtained conditional PDF P(c'(k), . . . c'(M)|input, Doppler, loading, and scheduler information is provided to the exemplary statistical algorithm at block 408 and in block 410, one or more criterion are provided to exemplary statistical algorithm at block 408. The exemplary statistical algorithm produces the modulation and coding scheme (MCS) µ *(k) for the transmission of interest at block 412.

For each possible sample waveform evolution of the channel across re-transmissions, and for each possible resource allocation combination, there can be evaluated offline the accumulated energy after due penalties and hence the probability (indicator function) of success/failure along with the resource cost and store it in Table 1 below that forms an exemplary data structure:

TABLE 1

|  | W(1), T(2), W(2), T(2), ... W(M), T(M) |  | $(G_wG_t)^M$ th column |
|---|---|---|---|
| c'(1), c'(2), ... c'(M) | (Σ W(i)T(i), P(ΣE$_s$/N$_t$ penalties <=E$_b$/N$_o^\#$)) |  |  |
|  |  | Search subspace of specific row index | and specific range of columns |
| $(G_c)^M$ th row |  |  |  |

Each cell in the above "key" matrix data structure is row indexed by an ensemble of specific channel conditions for M transmissions and column indexed by a particular resource allocation (MCS) combination for M transmissions. (Packet data size may also be included in the column index combination as also the modulation order m that substitutes for T(i) in the case of HSDPA). Thus, each cell corresponds to a specific combination of MCS transmitted over specific channel conditions. The total resource cost (along with the columnar components) and the indicator function of success or failure, i.e. $P(\Sigma E_s/N_t.\text{penalties}<=E_b/N_o^\#)$ by checking inequality (6) are pre-computed and stored in the cell. This data structure is common to all users that fall in the same Doppler category.

In an embodiment of the invention, resource allocation determinations are made using the pre-computed matrix data structure of Table 1, containing the total resource cost and an indicator function of success or failure or a conditional probability of failure, which is row indexed by an ensemble of channel conditions and column indexed by the resource allocation (MCS) combinations. In another embodiment of the invention, the pre-computed matrix data structure may be defined, maintained and looked up for each type of channel possibly associated with a user, that includes doppler or rate of variation of channel conditions.

In another embodiment of the invention, the pre-computed matrix data structure may be defined, maintained and looked up for each packet size possible in the communication system. In another embodiment of the invention, the pre-computed matrix data structure may be re-used for subsequent transmissions by using a subset of the data structure corresponding to the channel conditions and resource allocations of past transmissions.

$G_w$ is the chosen granularity of the Walsh space allocation; for example if the available Walsh space is allocated as all of the codes or half of it then $G_w=2$ levels. $G_t$ the granularity of the TTI=1 for HSDPA and 3 for EVDV. $G_c$ is the granularity of the C/I report, which is taken as the granularity levels of the achieved C/I as well and equals 16 for EVDV and 32 for HSDPA. Of course, $G_c$ can be made smaller if coarser granularity is desired for lower computational complexity.

In other embodiments, it may be worth the tradeoff of reduced complexity for coarser granularity if significant proportion of the gains of bin packing can be obtained with coarse granularity. Furthermore, system performance may be better off with coarser granularity choices and good algorithms that effectively use them than with superfine granularity of rates, but lacking efficient algorithms to exploit them (with poorly formulated heuristics typically being the alternative). For the same reason (and also due to diminishing returns with increased diversity) the number of re-transmissions $M_{max}$ that figures in the exponent in the formula for the size of the key data structure could be restricted to a small number like two or three.

As the re-transmissions proceed, the same data structure may be re-used for subsequent lookups, yet over a smaller dimension that is exponential reducing in the order of the remaining re-transmissions. The rows and columns of interest are obtained by fixing the channel conditions and resource allocation of the already occurred past transmissions. Based on this structure, an exemplary embodiment of the invention may implement the optimal and/or sub-optimal (approx MET, ML) variations of Statistical Bin Packing Algorithm.

In an embodiment for an approximate MET, the method for the case of maximum of two transmissions was set forth in (28) through (33). For the first transmission, an arbitrary resource combination x i.e. ($W_x$, $T_x$) is chosen as a candidate. This fixes a group of columns. Now for any ensemble of channel conditions, i.e. a fixed row index, we search over the group of columns to find a cell i.e. allocate resource combinations for the remaining transmissions such that a) the transmission has error rate better than the requirement and b) has minimum resource cost. If no cell meets a) then that cell having maximum resource allocation and hence the lowest error rate is chosen. This process of finding the cell or allocation with minimum resource cost is done for each row (i.e. channel condition) and the average resource cost and average error probability is computed using the probability of channel ensemble associated with each row. The whole procedure is repeated with a different resource combination y i.e. ($W_y$, $T_y$) as the candidate. That resource combination (W*, T*) whose average error probability is below the target and whose resource cost is minimum is assigned for the first transmission. Ties in resource cost are broken in favor of resource combination with lower error rate. For subsequent transmissions k>1, the same principle is applied recursively. Resources allocated to previous transmissions 1 through k−1 and their associated channel conditions that are now known to the base station essentially define and pre-fix a subgroup of rows and columns in the key data table. The best resource (in the approx MET sense) to allocate for the kth transmission by carrying out a similar search may be found, except that it is restricted within the subspace of intersecting rows and columns pre-fixed by earlier transmissions.

The ML rate algorithm for the case of maximum of two transmissions was elaborated in (34) through (41). For the first transmission, fix any ensemble of channel conditions, i.e. a fixed row index. Search over the cells in this row to find the best cell i.e. resource combinations for the first and remaining transmissions such that a) the transmission has error rate better than the requirement and b) has minimum resource cost. If no cell meets a) then that cell having maximum resource allocation, and hence the lowest error rate, is chosen. The first transmission component of the resource allocation combination is logged as a row winner along with the channel ensemble probability associated with the row. Additional row winner parameters like the resource cost and the error rate achieved by the winning combination may also be logged. The same procedure is repeated for every row (channel condition ensemble) in the table and the row winners and associated row probabilities are logged. Finally, every resource allocation combination that can be used as the first transmission component is ranked according to the aggregate likelihood (by accumulating the row probability when it is a winning combination) of being a row winner. That resource combination with top rank i.e. maximum likelihood is allocated for the first transmission. Ines in top rank are broken in favor of resource combination with lower average error rate or resource cost. For subsequent transmissions k>1, the same principle is applied recursively. Resources allocated to previous transmissions 1 through k−1 and their associated channel conditions that are now known to the base station essentially define and pre-fix a subgroup of rows and columns in the key data table. The best resource (in the ML sense) to allocate for the kth transmission may be found by carrying out a similar search except that it is restricted within the subspace of intersecting rows and columns pre-fixed by earlier transmissions.

In exemplary embodiment described above, the residual packet error rate PER<ε constraint has been a recurring theme. However, this can be dropped altogether and instead the throughput maximization $R_{harq}$ metric can be modified by multiplying the bits transmitted over the by (1-residual PER) achieved for a given resource allocation combination.

$$R^{harq}(1) = E\{[B(1)(1-PER(W(1), T(1), \ldots, W(M_{max}), T(M_{max})))]/[\Sigma_{i=1} W(i)T(i)/W_{avail}]\} \quad (71)$$

The step function approximation of the turbo code AWGN waterfall curve for reference MCS is not a necessity for the algorithm. The exact curve $f^*$ itself can be used—so instead of checking the condition whether an aggregate Eb/No (weighted by penalties) exceeds a reference Eb/No, whose probability is then an indicator function (with result 0 or 1), the actual probability for that aggregate Eb/No may be looked up and used to check whether the failure probability is less than □ in all relevant formulas.

Further as described above, the chase combining (CC) scenario described in (7) may not fit in the SBP formulation of (10). However, CC can be treated by an SBP formulation of slightly different form; although the analysis and resource allocation algorithms that follow use the same principles as for IR except that the dimensionality of resource allocation is considerably reduced. This is because the packet size, time and Walsh dimensions (that fixes the MCS) fixed for the first transmission remains fixed throughout all re-transmissions. So the resource allocation problem just reduces to one of figuring out the optimal format for the first transmission that minimizes resources across all transmissions taking into account control overheads etc. in a similar manner.

As described above, the fact that only two CDM-ed users are allowed at a time in 1xEVDV (with the additional constraint of the equality of their TTI T(i)) can be exploited in a special way by departing from the "greedy fill" approach, which was invoked for its simplicity in dealing with several CDM-ed users. The cost function could then depart from being based on individual user's code time resource product (or maximum expected throughput) basis to a joint sum throughput metric of two users. In doing so, key fairness conditions need to be preserved, such as the first priority user always transmits the largest number of bits possible in case of a new transmission.

As described above in conjunction with the various exemplary embodiment of the present invention, the problem of deciding the "right" rate or MCS or aggression factor of a scheduled user in a packet data system using Adaptive and Asynchronous IR was discussed in detail and formulated as a statistical bin packing problem and solved for the criterion that maximized expected throughput. Exemplary embodiments of the present invention also describe sub-optimal methods and algorithms for other criteria were also described together with fast implementation strategies. Exemplary embodiments of the present invention using the rate or throughput determined by statistical bin packing algorithm in the scheduler priority function were also described.

As described above in conjunction with the various exemplary embodiments of the present invention, BTS/BSC are terms generally associated with North American systems, but the present invention may be used with any type of base station (such as the European "Node B") and any type of controller (such as the European "RNC").

The invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A method of transmitting or retransmitting a packet in a communication system comprising:
    determining a modulation and coding scheme (MCS) and corresponding resource allocation as a function of at least one of a determined past, a determinable current, and a future statistic of at least one of channel conditions and resource allocation; and
    transmitting a coded modulated version of said packet in said communication system according to said MCS, wherein any given transmission attempt ($k^{th}$) of said packet of a plurality of permitted transmission attempts ($M_{max}$) satisfies a constraint that a residual packet error probability after $M_{max}$ is below a desired target error rate.

2. The method of claim 1, wherein the modulation and coding scheme (MCS) and corresponding resource allocation is determined as a function of at least two of the determined past, the determinable current, and the future statistic of at least one of channel conditions and resource allocation.

3. The method of claim 1, wherein said resource allocation and MCS are determined at each said $K^{th}$ transmission of the packet to reduce an expected value of a cost while satisfying the constraint of said residual packet error probability.

4. The method of claim 3, wherein the cost is a function of an expected value or average operation and said residual packet error probability is a function of a resource allocation during the $i_{th}$ transmission attempt of the packet (where i=1 to $M_{max}$) and a channel condition during the $i^{th}$ transmission attempt of the packet and the cost.

5. The method of claim 1, wherein an optimal-approaching choice of resource allocation, includes determining at least one of the optimal-approaching resource allocations of (a) a first transmission of the packet, (b) the $i^{th}$ transmissions of the packet (for k<=i<$M_{max}$), and (c) the last $k^{th}$ transmission of the packet (1<=K<=$M_{max}$).

6. The method of claim 5, wherein the optimal-approaching choice of resource allocation for a first transmission is obtained by computing a minimum of a set of cost values subject to a constraint which is a function of a resulting frame error rate.

7. The method of claim 6, wherein the set of cost values is obtained by taking a sum of an actual cost associated with each choice of resource allocation for the first transmission and an estimated cost of any choice of resource allocation for transmissions two through $M_{max}$ which satisfy the constraint, including
  making a choice of resource allocations for the second through last transmissions,
  for every choice of resource allocation for the first transmission, compute the estimated costs associated with the choice made for the second transmission through the $M_{max}$ transmission,
  computing the sum of the cost of all the estimated costs and the actual cost associated with the choice made for the first transmission to produce a set of costs,
  selecting values in the set of costs for which the frame error rate constraints are met, and
  selecting the minimum value of the values selected as an optimal value.

8. The method of claim 5, wherein the optimal-approaching choice of resource allocation for the $i^{th}$ transmission (for k<=i<$M_{max}$) decided at any kth transmission stage (1<=k<=Mmax) is obtained by computing the minimum of a set of cost values subject to a constraint function expressing the resulting residual error probability.

9. The method of claim 8, wherein the set of cost values is obtained by taking the sum of fixed costs associated with transmissions 1 through (i−1) based on deterministic resource allocation and channel conditions, a cost of every choice of resource allocation for the $i^{th}$ transmission, and an estimated cost of any choice of resource allocation for transmissions (i+1) through $M_{max}$ subject to satisfying the residual probability of error constraint function.

10. The method of claim 5, wherein the optimal-approaching choice of resource allocation for the last transmission decided at any kth transmission stage (1<=k<=Mmax) is obtained by computing the minimum of a set of cost values subject to a constraint function expressing a resulting residual error probability.

11. The method of claim 10, wherein the set of cost values is obtained by taking the sum of the actual costs associated with all previous transmissions and expected costs of every choice of resource allocation for the last transmission subject to satisfying the residual error probability constraint.

12. The method of claim 5, wherein the optimal-approaching choice of resource allocation includes iteratively obtaining optimal values of the resource allocation at every stage beginning with the $M_{max}$ transmission and working backwards to the kth transmission of interest.

13. The method of claim 12, wherein the optimal values of any stage i may be estimates or expectations, where at each step of the iterative process, resource allocations that do not satisfy the residual probability error constraint function are excluded.

14. The method of claim 13, wherein the expectations are conditioned on deterministic resources and channel conditions measured, computed or assumed from stages previous to the ith stage.

15. The method of claim 1, wherein a near-optimal-approaching choice of resource allocation, includes, at any said $K^{th}$ transmission of the packet, determining a candidate vector value of resource allocations of current and future transmission of the packet up to $M_{max}$.

16. The method of claim 15, wherein the resource allocation at any given stage is obtained by
  fixing any candidate vector value of resource allocations of the current and future stages up to $M_{max}$,
  if a total probability of residual error for the candidate resource allocation is larger than a target, the candidate resource allocation is rejected as infeasible,
  among all feasible candidate resource allocations, selecting the one with a minimum total cost,
  in case of ties, breaking ties in favor of the resource allocation vector that has the lowest residual error probability, and
  setting a first element of the resource allocation vector as the desired resource allocation for the current stage.

17. The method of claim 16, wherein fixing any candidate vector value of resource allocations of the current and future stages up to $M_{max}$ includes
  fixing a vector value of the future channel conditions with an associated channel condition vector probability of occurrence obtained from a joint probability density function that models the channel during times of the impending current and future transmissions of the packet,
  finding the conditional residual error probability for each candidate resource allocation conditioned on the fixed future channel conditions by looking up a reference error curve,
  multiplying the conditional error probability with the channel condition vector probability,
  varying the channel condition vector and its associated probability and repeating said fixing, finding, and multiplying steps and accumulate probabilities for each iteration to yield a total probability of residual error, and
  summing the costs of the candidate resource allocation components to obtain a total cost of the candidate resource allocation.

18. The method of claim 17, wherein the reference error curve is expressed as 0 if a desired signal-to-noise, due to the combination of fixed resource allocation and past, present and future channel conditions, is exceeded and 1, if not.

19. The method of claim 1, wherein a near-optimal-approaching choice of resource allocation, includes, at any said $K^{th}$ transmission of the packet, determining a candidate resource allocation of the current transmission of the packet and candidate vector value of resource allocations of the future stages up to $M_{max}$.

20. The method of claim 19, wherein the resource allocation at any given stage is obtained by
   fixing a candidate resource allocation for the current stage,
   fixing any candidate vector values of resource allocations of future stages up to $M_{max}$,
   setting the total cost of resource allocation at the current stage as a function of the choice of current resource allocation to the expected minimum cost of the future allocation plus the cost of the choice of current resource allocation,
   among all feasible current resource allocations, selecting the one with the minimum total cost of resource allocation, and
   in case of ties, breaking the tie in favor of the current resource allocation vector that has the lowest residual error probability, where the current resource allocation that results in a minimum total cost is the desired resource allocation for the current stage.

21. The method of claim 20, wherein the step of fixing any candidate vector values of resource allocations of future stages up to $M_{max}$, includes
   fixing a vector value of the future channel conditions with an associated channel condition vector probability of occurrence obtained from a joint probability density function that models the channel during times of the impending current and future transmissions of the packet,
   finding the conditional residual error probability for the choice of current resource allocation and candidate future resource allocation conditioned on the fixed channel conditions by looking up a reference error curve,
   checking if the conditional error probability is greater than the target residual error probability and if yes, then the candidate future resource allocation is rejected as infeasible,
   if feasible, summing the costs of the candidate resource allocation components to obtain a total cost of the feasible candidate future resource allocation,
   selecting among all feasible candidate future resource allocations for that channel condition vector, the one with the least cost, wherein if no candidates are feasible, selecting the largest resource allocation,
   multiplying the conditional error probability of the least cost future resource allocation with the associated channel condition probability,
   varying the channel condition vector and the associated probability and repeating the fixing, finding and checking steps and averaging the least cost resource allocation by weighing with the channel condition vector probability of each iteration and summing to yield the average cost of future resource allocation given the choice of resource allocation for the current stage,
   accumulating the product of the conditional error probability and channel condition probability over all channel conditions, and
   checking if the resultant is less than a target residual error probability, and if so, the choice of current resource allocation is feasible.

22. The method of claim 21, wherein the reference error curve is expressed as 0 if a desired signal-to-noise, due to the combination of fixed resource allocation and past, present and future channel conditions, is exceeded and 1, if not.

23. The method of claim 1, wherein a near-optimal-approaching choice of resource allocation, includes, at any said $K^{th}$ transmission of the packet, determining a channel condition vector of the current transmission of the packet and future transmission of the packet, having associated probability retrieved from a joint probability distribution function of channel conditions and determining a candidate vector value of resource allocation of the current transmission of the packet and candidate vector value of resource allocations of the future stages up to $M_{max}$.

24. The method of claim 23, wherein the resource allocation at any given stage is obtained by
   fixing a channel condition vector for the impending and future transmissions with associated probability taken from the joint probability distribution function of channel conditions,
   fixing any candidate vector value of resource allocations of the current and future stages up to $M_{max}$, said fixing any candidate vector value of resource allocations further including
      finding the conditional residual error probability for the choice of current resource allocation and candidate future resource allocation conditioned on the fixed channel conditions by looking up a reference error curve,
      checking if the conditional error probability is greater than the target residual error probability and if so, then the candidate future resource allocation is rejected as infeasible,
      if feasible, summing the costs of the candidate resource allocation components to obtain a total cost of the feasible candidate future resource allocation,
      among all feasible candidate future resource allocations for the channel condition vector, choosing the one with the least cost,
      if no candidates are feasible, choosing the largest resource allocation,
      selecting the choice of current resource allocation of the least cost future resource allocations and the associated channel condition probability,
   varying the channel condition vector and an associated probability and repeat the finding, checking, summing, choosing, and selecting steps and accumulating the channel condition probability separately in all cases where the choice of current resource allocation coincide, and
   assigning the choice of the current resource allocations that is most likely to cause a least cost resource allocation overall as the current resource allocation with the largest accumulated channel condition probability.

25. The method of claim 24, wherein the reference error curve is expressed as 0 if a desired signal-to-noise, due to the combination of fixed resource allocation and past, present and future channel conditions, is exceeded and 1, if not.

26. A method of transmitting or retransmitting a packet in a communication system comprising:
   determining a modulation and coding scheme (MCS) and corresponding resource allocation as a function of at least one of a determined past, a determinable current, and a future statistic of at least one of channel conditions and resource allocation; and
   transmitting a coded modulated version of said packet in said communication system according to said MCS, wherein resource allocation determinations are made using a pre-computed matrix data structure, containing the total resource cost and an indicator function of success or failure or a conditional probability of failure, which is row indexed by an ensemble of channel conditions and column indexed by the resource allocation (MCS) combinations.

27. The method of claim 26, wherein the pre-computed matrix data structure may be defined, maintained and looked up for each type of channel possibly associated with a user, that includes doppler or rate of variation of channel conditions.

28. The method of claim 26, wherein the pre-computed matrix data structure may be defined, maintained and looked up for each packet size possible in the communication system.

29. The method of claim 26, wherein the pre-computed matrix data structure may be re-used for subsequent transmissions by using a subset of the data structure corresponding to the channel conditions and resource allocations of past transmissions.

* * * * *